US007739022B2

United States Patent
Kobayashi et al.

(10) Patent No.: US 7,739,022 B2
(45) Date of Patent: Jun. 15, 2010

(54) VEHICLE DRIVING ASSIST SYSTEM

(75) Inventors: Yosuke Kobayashi, Yokohama (JP);
Takeshi Kimura, Yokohama (JP);
Yukinori Nishida, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 20 days.

(21) Appl. No.: 11/640,500

(22) Filed: Dec. 18, 2006

(65) Prior Publication Data

US 2007/0145818 A1  Jun. 28, 2007

(30) Foreign Application Priority Data

Dec. 22, 2005  (JP)  ............... 2005-369539
Oct. 6, 2006  (JP)  ............... 2006-275467

(51) Int. Cl.
*G06F 19/00* (2006.01)
*G06F 7/70* (2006.01)
*G06G 7/00* (2006.01)
*G06G 7/76* (2006.01)
*B60K 28/12* (2006.01)
*B60K 28/14* (2006.01)
*B60R 21/00* (2006.01)
*B60R 22/00* (2006.01)
*B60T 8/32* (2006.01)
*B60Q 1/00* (2006.01)
*B62D 49/08* (2006.01)
*G05D 1/00* (2006.01)
*G05D 3/00* (2006.01)
*G08G 1/00* (2006.01)
*G08G 1/16* (2006.01)
*G06F 17/10* (2006.01)
*E05F 15/00* (2006.01)

(52) U.S. Cl. ............... 701/70; 180/282; 340/435; 340/436; 701/48; 701/93; 701/116; 701/301

(58) Field of Classification Search .................. None
See application file for complete search history.

(56) References Cited

U.S. PATENT DOCUMENTS

| 6,265,990 B1 * | 7/2001 | Isogai et al. ............... 340/903 |
| 6,272,418 B1 | 8/2001 | Shimamura et al. |
| 2005/0143890 A1 * | 6/2005 | Minowa et al. ............... 701/70 |
| 2005/0240330 A1 * | 10/2005 | Heinrichs-Bartscher ...... 701/48 |
| 2006/0195231 A1 | 8/2006 | Diebold et al. |

FOREIGN PATENT DOCUMENTS

| DE | 19856790 A1 | 6/1999 |
| DE | 19944556 A1 | 3/2001 |
| EP | 1375280 A2 | 1/2004 |

(Continued)

*Primary Examiner*—Khoi Tran
*Assistant Examiner*—Nicholas Kiswanto
(74) *Attorney, Agent, or Firm*—Global IP Counselors, LLP

(57) ABSTRACT

A vehicle driving assist system is provided that increases an actuation reaction force exerted by the accelerator pedal, when it is operated, as a risk potential with respect to a preceding obstacle increases. The system also lowers the driving force and increases the braking force exerted against the host vehicle as the risk potential increases. During braking/driving force control based on the risk potential, the system changes a braking/driving force control operating schedule in accordance with the driver's intentions with respect to accelerate or decelerate.

25 Claims, 31 Drawing Sheets

FOREIGN PATENT DOCUMENTS

| | | |
|---|---|---|
| EP | 1484212 A1 | 12/2004 |
| JP | H09-286313 | 11/1997 |
| JP | 2001-122094 A1 | 5/2001 |
| WO | WO-2004/085220 A1 | 10/2004 |
| WO | WO-2005/084993 A1 | 9/2005 |

* cited by examiner (a) DISTANCE BETWEEN HOST VEHICLE AND PRECEDING VEHICLE IS LONG (b) DISTANCE BETWEEN HOST VEHICLE AND PRECEDING VEHICLE IS SHORT

| ST | α | β | |
|---|---|---|---|
| ST1 | α1=0.2 | β1=2 | (ACCELERATION) |
| ST2 | α2=0.6 | β2=1.6 | (CONSTANT SPEED) |
| ST3 | α3=1.0 | β3=1.0 | (ENGINE BRAKING) |
| ST4 | α4=1.0 | β4=1.0 | (DECELERATION) |

| ST | α | β |
|---|---|---|
| ST1 | α1=0.2 | β1=2 |
| ST2 | α2=0.6 | β2=1.6 |
| ST3 | α3=0.8 | β3=1.2 |
| ST4 | α4=1.0 | β4=1.0 |

Fig. 44

| ST | α | β |
|---|---|---|
| ST1 | α1=0.0 | β1=2 |
| ST2 | α2=0.6 | β2=1.0 |
| ST3 | α3=0.8 | β3=1.0 |
| ST4 | α4=1.0 | β4=1.0 |

Fig. 45

VEHICLE DRIVING ASSIST SYSTEM

CROSS-REFERENCE TO RELATED APPLICATIONS

This application claims priority to Japanese Patent Application Nos. 2005-369539, filed on Dec. 22, 2005 and 2006-275467, filed Oct. 6, 2006. The entire disclosures of Japanese Patent Application Nos. 2005-369539 and 2006-275467 are hereby incorporated herein by reference.

BACKGROUND OF THE INVENTION

1. Field of the Invention

The present invention relates to a vehicle driving assist system. More specifically, the present invention relates to a vehicle driving assist system configured to assist a driver with respect to the operation of a host vehicle.

2. Background Information

Several conventional vehicle driving assist systems have been proposed for conveying information to a driver of a host vehicle about a preceding obstacle that is determined to be a potential risk to the host vehicle. One example of such a vehicle driving assist system is disclosed in Japanese Laid-Open Patent Publication No. 9-286313. This conventional vehicle driving assist system uses a laser radar or other sensor to detect an obstacle in front of the host vehicle and executes braking control so as to decelerate the host vehicle when the chances of contact (potential risk) between the host vehicle and the preceding obstacle are high. With such a system, as the speed of the host vehicle becomes higher (faster), the deceleration rate will become the larger when the braking control is executed. Consequently, regardless of the vehicle speed, a degree of deceleration shock will be imparted to the driver.

SUMMARY OF THE INVENTION

In the conventional system just described, when braking control is executed in accordance with the degree of possibility of contact with the preceding obstacle, there will be times when the driver cannot obtain the intended acceleration when he or she depresses the accelerator pedal. Also a possibility exists that a larger than expected deceleration will occur in situations where the driver operates the accelerator pedal in the release direction. In other words, in this situation, the driver may experience an odd feeling about the vehicle performance.

In accordance with one aspect of the present invention, a vehicle driving assist system is provided that basically comprises a risk potential calculating section, a braking/driving force control amount calculating section, a braking/driving force control section, an acceleration/deceleration intent detecting section and an operating schedule changing section. The preceding obstacle detecting section is configured to detect a preceding obstacle existing in front of the host vehicle. The risk potential calculating section is configured to calculate a risk potential of a host vehicle with respect to a preceding obstacle based on detected information regarding the preceding obstacle. The braking/driving force control amount calculating section is configured to calculate a braking/driving force control amount based on the risk potential calculated by the risk potential calculating section for controlling at least one of a braking force and a driving force exerted against the host vehicle. The braking/driving force control section is configured to control at least one of the driving force and the braking force exerted against the host vehicle in accordance with a preset operating schedule based on the braking/driving force control amount calculated by the braking/driving force control amount calculating section. The acceleration/deceleration intent detecting section is configured to detect an acceleration/deceleration intent of a driver. The operating schedule changing section is configured to change the operating schedule based on a detection result from the acceleration/deceleration intent detecting section.

BRIEF DESCRIPTION OF THE DRAWINGS

Referring now to the attached drawings which form a part of this original disclosure:

FIG. 44 is a table showing another example of the relationships among the correction coefficients and the acceleration/deceleration intent; and FIG. 45 is a table showing another example of the relationships among the correction coefficients and the acceleration/deceleration intent.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
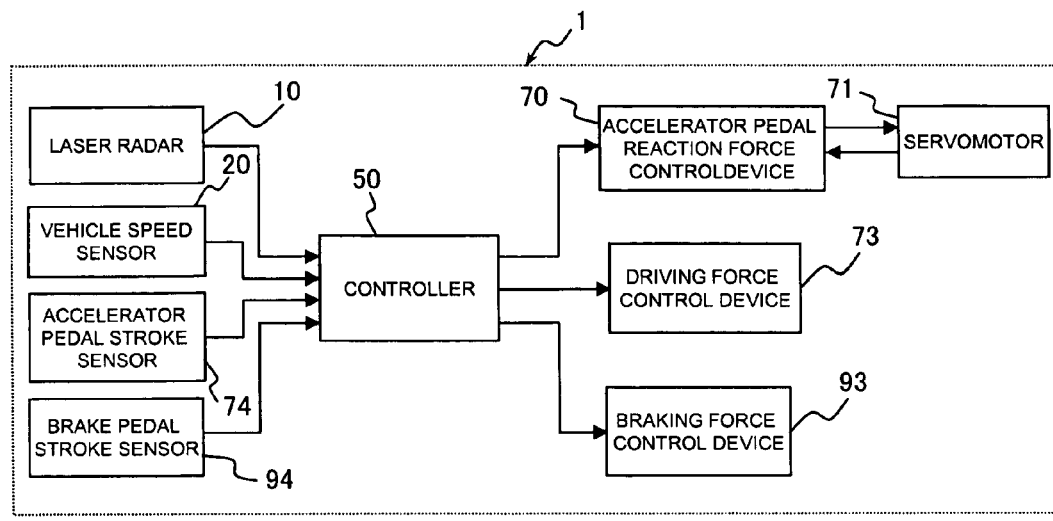
FIG. 1 is a block diagram of a vehicle driving assist system in accordance with a first embodiment of the present invention.
Figure 2:
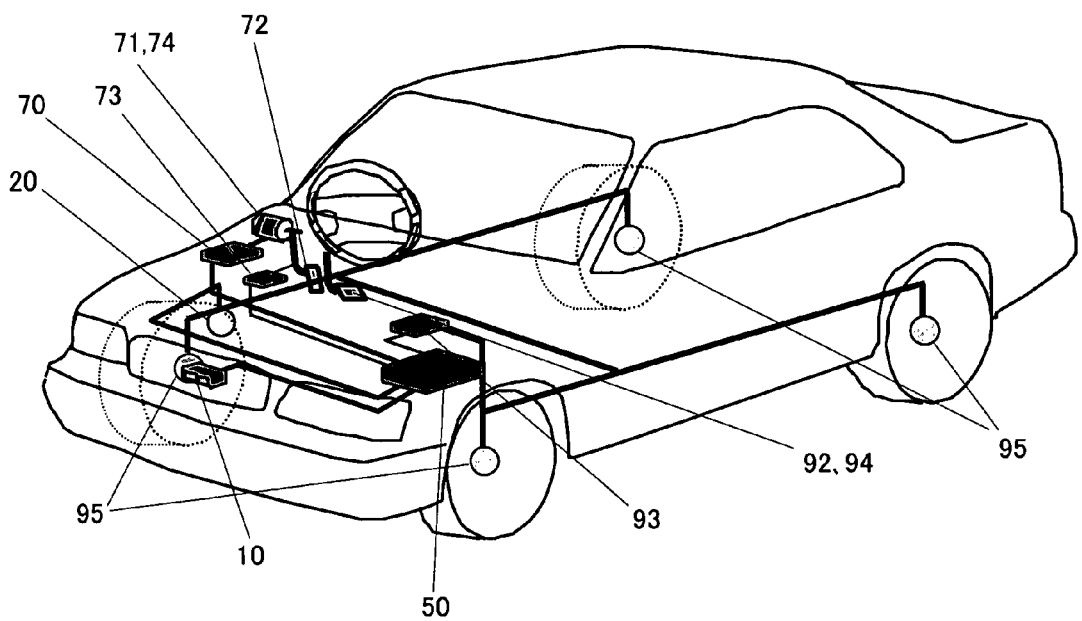
FIG. 2 is a simplified diagrammatic perspective view of a vehicle in which the vehicle driving assist system shown in FIG. 1 is installed in accordance with the first embodiment of the present invention.

Referring initially to FIG. 1, a vehicle driving assist system is illustrated in accordance with a first embodiment of the present invention. FIG. 1 is a block diagram of a vehicle driving assist system in accordance with the first embodiment of the present invention. FIG. 2 is a schematic perspective view of a vehicle (hereinafter also called "the host vehicle") in which the vehicle driving assist system shown in FIG. 1 is installed in accordance with the first embodiment of the present invention.

First, the main structures and features of the vehicle driving assist system will now be explained. A laser radar 10 is mounted to a front grill portion, a bumper portion, or the like of the host vehicle and serves to horizontally scan a region in front of the host vehicle with an infrared light pulse. The laser radar 10 then measures the reflected light resulting from the infrared light reflecting off of a plurality of reflecting objects located in front of the host vehicle (normally, the rear ends of preceding vehicles). By measuring the time required for the reflected light to arrive, the laser radar 10 detects the following distance and existence direction to a plurality of preceding vehicles. The detected following distances and existence directions are sent to a controller 50. In this embodiment, the existence directions of preceding objects can be expressed as a relative angle with respect to the vehicle in which the driving assist system 1 is installed. The region in front of the host vehicle scanned by the laser radar 10 is, for example, ±6 degrees with respect to the front of the host vehicle and the system detects preceding objects existing within this angular range.

The vehicle speed sensor 20 is configured and arranged to detect the speed of the host vehicle. The vehicle speed sensor 20 outputs a signal indicative of the speed of the host vehicle to the controller 50. For example, the vehicle speed sensor 20 is configured and arranged to measure the rotational speed of the wheels and the rotational speed of the output side of the transmission, and then output the detected vehicle speed to the controller 50.

The controller 50 comprises a CPU and a ROM, a RAM, and other components peripheral to the CPU and serves to control the entire vehicle driving assist system 1. Based on the speed of the host vehicle received from the vehicle speed sensor 20 and the following distance information received from the laser radar 10, the controller 50 recognizes the obstacle situation in the vicinity of the host vehicle, e.g., recognizes the traveling situation with respect to the preceding obstacles in terms of relative distances and relative velocities with respect to the preceding obstacles. Based on the preceding obstacle situation, the controller 50 calculates risk potentials indicating the degree of convergence between the host vehicle and each preceding obstacle. The controller 50 also executes the control described below based on the risk potentials with respect to the obstacles.

The controller 50 sends the calculated longitudinal reaction force control amount to an accelerator pedal reaction force control device 70 and sends the calculated braking force correction amount and driving force correction amount to a braking force control device 93 and a driving force control device 73, respectively.

By controlling the reaction force generated when an accelerator pedal 72 (which is a driver-operated driver operation device) is depressed and at least one of a braking force and a driving force exerted against the vehicle, the vehicle driving assist system 1 assists driver in an appropriate manner with respect to acceleration and deceleration of the host vehicle in accordance with the first embodiment. In order to accomplish this, the controller 50 calculates a vehicle longitudinal reaction force control amount, a braking force correction amount, and a driving force correction amount based on the risk potentials with respect to the preceding obstacles in front of the host vehicle. The controller 50 outputs the calculated longitudinal reaction force control amount to an accelerator pedal reaction force control device 70. The controller 50 also outputs the calculated driving force correction amount to a driving force control device 73, and outputs the calculated braking force correction amount to a braking force control device 93.

Based on the reaction force control amount from the controller 50, the accelerator pedal reaction force control device 70 controls the torque generated by a servomotor 71 built into a linkage mechanism of the accelerator pedal 72. The servomotor 71 is configured and arranged to control the reaction force generated based on a command value from the accelerator pedal reaction force control device 70 and can freely control the actuation reaction force (accelerator pedal depression force) generated when the driver operates the accelerator pedal 72.

An accelerator pedal stroke sensor 74 is configured and arranged to detect the depression amount (actuation amount) of the accelerator pedal 72. The accelerator pedal stroke sensor 74 is configured and arranged to output a signal indicative of the depression amount (actuation or operation amount) of the accelerator pedal 72. The depression amount of the accelerator pedal 72 is converted into a rotation angle of the servomotor 71 by the linkage mechanism. The accelerator pedal stroke sensor 74 outputs the detected accelerator pedal actuation amount to the controller 50 and the driving force control device 73. A brake pedal stroke sensor 94 is configured and arranged to detect the depression amount (actuation amount) of the brake pedal 92 and outputs the detected brake pedal actuation amount to the controller 50 and the braking force control device 93.

Figure 3:
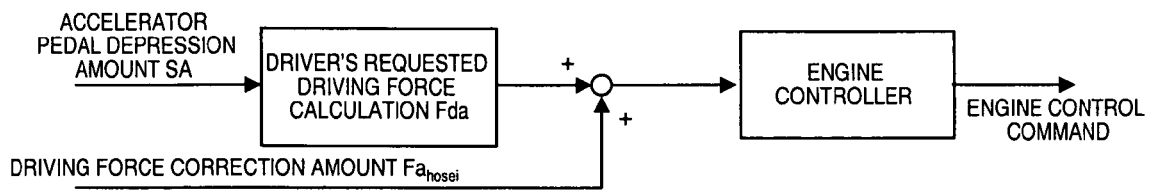
FIG. 3 is a diagram for explaining the general concept of the driving force control.
Figure 4:
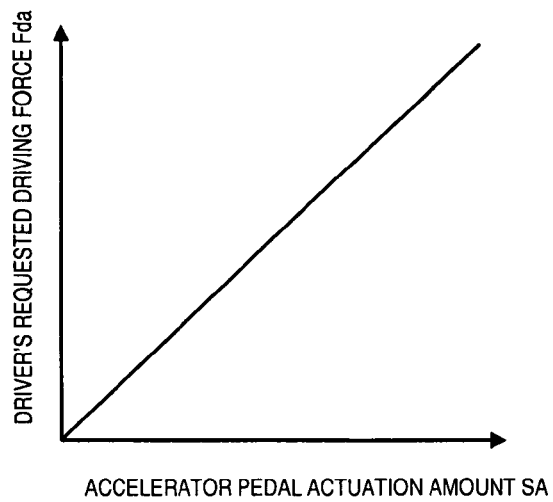
FIG. 4 is a graph plotting the requested driving force versus the accelerator pedal depression amount.

The driving force control device 73 is configured to calculate a control command for the engine. FIG. 3 is a block diagram of the driving force control executed by the driving force control device 73. FIG. 4 is a characteristic map plotting the driver's requested driving force Fda versus the accelerator pedal actuation amount SA. The driving force control device 73 uses a map like that shown in FIG. 4 to calculate the driver's requested driving force Fda based on the accelerator pedal actuation amount SA. The driving force control device 73 adds a driving force correction amount Fa (explained later) to the driver's requested driving force Fda so as to calculate a target driving force. The driving force control device 73 has an engine controller that calculates a control command for the engine based on the target driving force.

Figure 5:
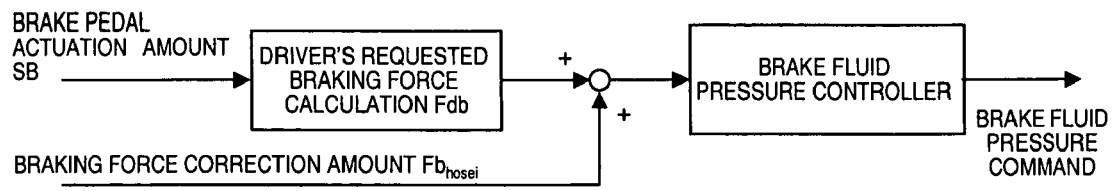
FIG. 5 is a diagram for explaining the general concept of the braking force control.
Figure 6:
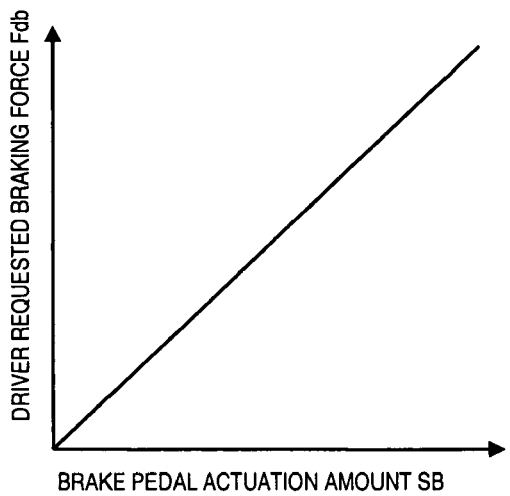
FIG. 6 is a graph plotting the requested braking force versus the brake pedal depression amount.

The braking force control device 93 is configured to output a brake fluid pressure command. FIG. 5 is a block diagram of the braking force control executed by the braking force control device 93. FIG. 6 is a characteristic map plotting the driver's requested braking force Fdb versus the brake pedal actuation amount SB. The driving force control device 93 uses a map like that shown in FIG. 6 to calculate the driver's requested braking force Fdb based on the brake pedal actuation amount SB. The driving force control device 93 adds a braking force correction amount Fb (explained later) to the driver's requested driving force Fdb so as to calculate a target braking force. The braking force control device 93 has a brake fluid pressure controller configured to output a brake fluid pressure command based on the target braking force. A brake device 95 is provided on each of the wheels of the host vehicle. The brake devices 95 operate in accordance with a control command issued from the brake fluid pressure controller.

The controller 50 comprises the following sections provided, for example, in a CPU software format: an obstacle recognizing section 51, a risk potential calculating section 52, an accelerator pedal reaction force calculating section 53, a braking/driving force correction amount calculating section 54, an acceleration/deceleration intent detecting section 55, an operating schedule changing section 56, and a braking/driving force correction amount adjusting section 57.

Figure 7:
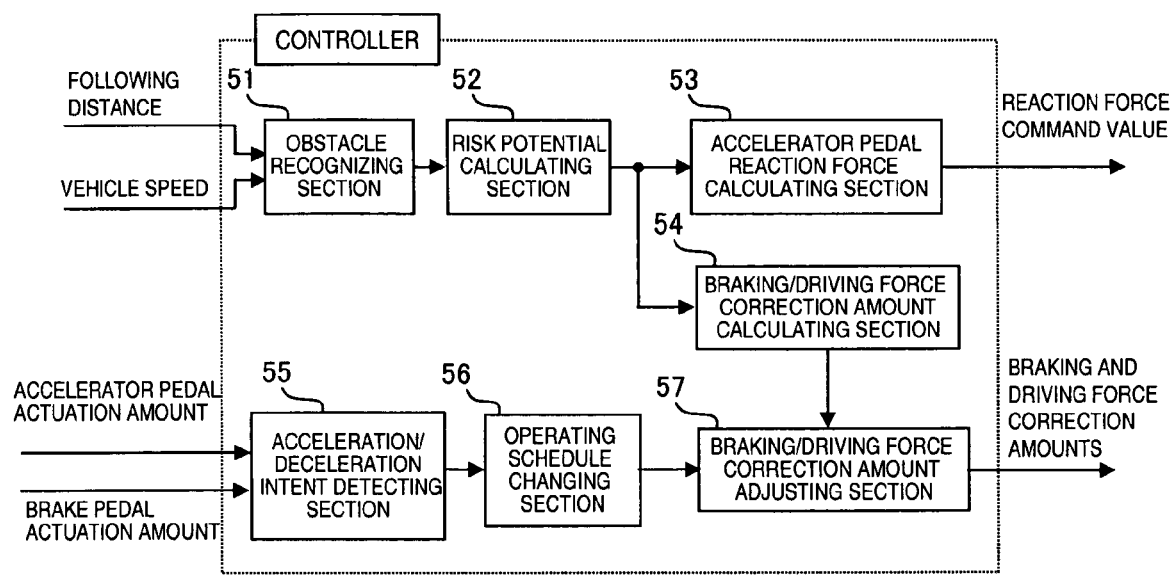
FIG. 7 is a block diagram showing the internal components of the controller in accordance with the first embodiment of the present invention.

FIG. 7 is a simplified block diagram of the internal and peripheral components of the controller 50. The controller 50 preferably includes a microcomputer with a control program that controls the system 1 in a manner as discussed below. The controller 50 can also include other conventional components such as an input interface circuit, an output interface circuit, and storage devices such as a ROM (Read Only Memory) device and a RAM (Random Access Memory) device. The controller 50 basically comprises for example a software, an obstacle recognizing section 51, a risk potential calculating section 52, an accelerator pedal reaction force calculating section 53, a braking/driving force correction amount calculating section 54, an acceleration/deceleration intent detecting section 55, an operating schedule changing section 56, and a braking/driving force correction amount adjusting section 57.

The preceding obstacle recognizing section 51 recognizes the preceding obstacle situation in front of the vehicle based on detection values from the laser radar 10 and the vehicle speed sensor 20. Based on the preceding obstacle situation recognized by the preceding obstacle recognizing section 51, the risk potential calculating section 52 calculates risk a potential RP indicating the degree of convergence between the vehicle and a preceding obstacle in front of the vehicle.

Based on the risk potential RP calculated by the risk potential calculating section 52, the accelerator pedal reaction force calculating section 53 calculates a control command value for the actuation reaction force to be exerted by the accelerator pedal 72. The braking/driving force correction amount calculating section 54 is configured to calculate the braking force and driving force correction amounts for braking/driving force control based on the risk potential RP. The acceleration/deceleration intent detecting section 55 is configured to detect the driver's intent with respect to acceleration and deceleration (i.e., acceleration/deceleration intent of the driver) while driving the host vehicle. It calculates the acceleration/deceleration intent based on the accelerator pedal actuation amount SA detected by the accelerator pedal stroke sensor 74 and the brake pedal actuation amount SB detected by the brake pedal stroke sensor 94.

When it executes braking/driving force control, the controller 50 uses the braking force correction amount and the driving force correction amount calculated by the braking/driving force correction amount calculating section 54 to control the driving force and the braking force exerted against the host vehicle in accordance with one of a plurality of preset operating schedules. The operating schedule changing section 56 is configured to change the operating schedule based on the acceleration/deceleration intent of the driver detected by the acceleration/deceleration intent detecting section 55. The braking/driving force correction amount adjusting section 57 is configured to change the braking force and driving force correction amounts in accordance with the operating schedule selected by the operating schedule changing section 56. The braking force correction amount is sent to the braking force control device 93, while the driving force correction amount is sent to the driving force control device 73.

Figure 8:
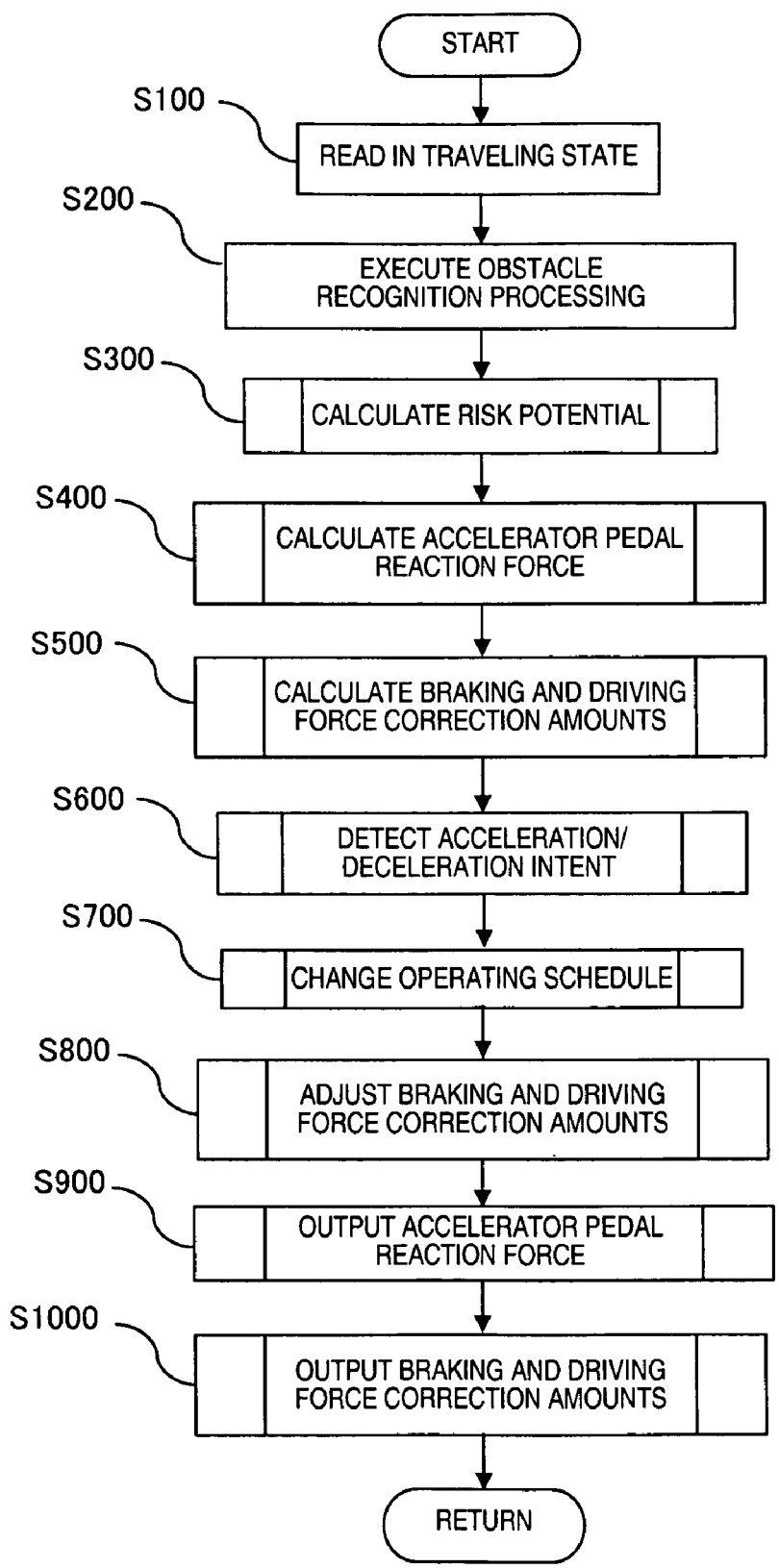
FIG. 8 is a flowchart showing the processing steps executed by the driving assistance control program in accordance with the first embodiment of the present invention.

The operation of the vehicle driving assist system 1 in accordance with the first embodiment will now be explained in more detail with reference to FIG. 8. FIG. 8 is a flowchart showing the processing steps of the driving assistance control executed by the controller 50 in the first embodiment. This control loop is executed continuously once per prescribed time period, e.g., every 50 msec.

In step S100, the controller 50 reads in the traveling state or situation of the host vehicle. The traveling state or situation mentioned here constitutes information related to the traveling circumstances of the vehicle, including information regarding preceding obstacles in front of the vehicle. Thus, the controller 50 reads in the following distance X and existence direction to the preceding obstacle detected by the laser radar 10 and the traveling speed Vh of the host vehicle (the vehicle in which the system 1 is installed) as detected by the vehicle speed sensor 20.

In step S200, the controller 50 recognizes the situation regarding preceding obstacles in front of the host vehicle based on the traveling situation data read in step S100. More specifically, the controller 50 recognizes the current relative position, the current movement direction, and the current movement velocity of the preceding obstacles with respect to the host vehicle based on the current traveling situation data obtained in step S100 and based on the prior relative position, the prior movement direction, and the prior movement velocity of the preceding obstacles with respect to the host vehicle that were detected during or prior to the previous control cycle that were stored in the memory of the controller 50. The controller 50 then recognizes the manner in which the preceding obstacle is disposed in front of the host vehicle and the manner in which the preceding obstacle is moving relative to the movement of the host vehicle.

In step S400, the controller 50 calculates a risk potential RP indicating the degree of convergence between the host vehicle and the preceding obstacle in front of the vehicle. The term "risk potential" refers to the degree of risk or possibility of danger of a collision. In this embodiment, the risk potential is contrived to increase as the host vehicle and a preceding obstacle existing in the vicinity of the host vehicle draw closer together. Thus, it can be the that the risk potential RP is a physical quantity that expresses how close the host vehicle and the preceding obstacle are to each other, i.e., the degree to which the host vehicle and the preceding obstacle have drawn near to each other (degree of convergence). The method of calculating the risk potential RP will now be described.

Figures 9, 10:
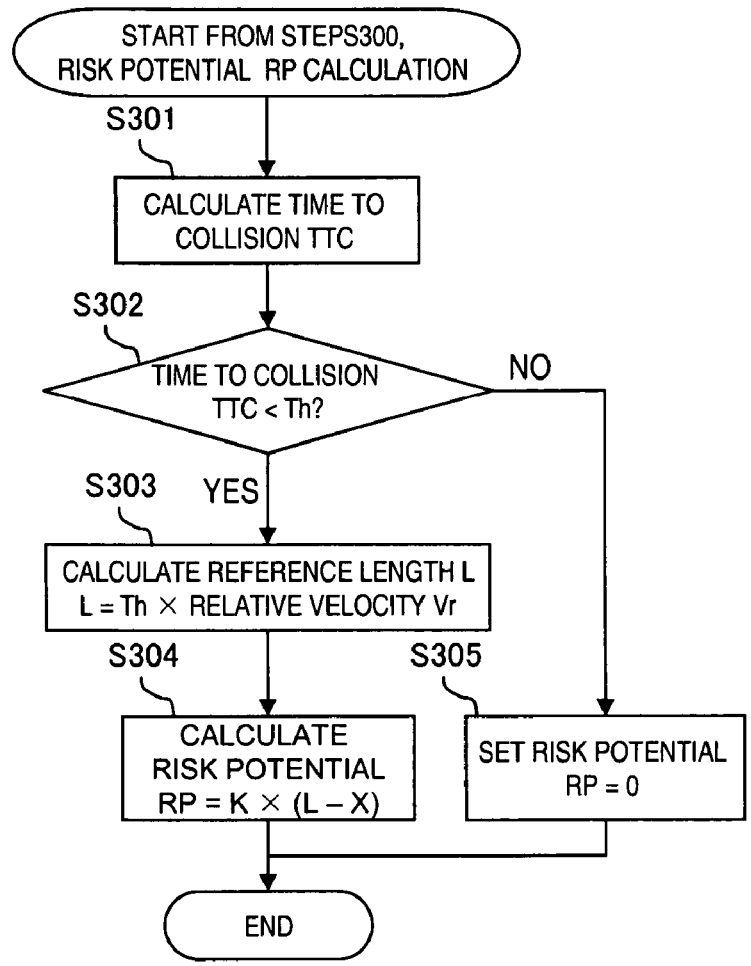
FIG. 9 is a pair of diagrams illustrating the concept of the risk potential of the host vehicle in which the driving assist system is installed.
FIG. 10 is a flowchart for explaining the processing steps executed in order to calculate the risk potential.

Referring to FIG. 9, two cases are schematically modeled to explain method of calculating the risk potential RP. Consider a model in which it is assumed that an imaginary elastic body 300 is provided on the front of the host vehicle 100 as shown in diagram (a) of FIG. 9. The imaginary elastic body 300 touches against the preceding vehicle 200 and is compressed, thereby generating a pseudo running resistance against the movement of the host vehicle 100. Here, the risk potential RP with respect to the preceding obstacle is defined to be the spring force that results when, as shown in diagram (b) of FIG. 9, the imaginary elastic body 300 contacts the preceding vehicle 200 and is compressed. The method of calculating the risk potential RP will now be explained with reference to the flowchart of FIG. 10.

In step S301, the controller 50 calculates the amount of time TTC (time to collision) until the host vehicle contacts the preceding vehicle recognized in front of the host vehicle in step S200. The time to collision TTC is a physical quantity indicating the current degree of convergence of the host vehicle with respect to the preceding vehicle. More specifically, the time to collision TTC is a value indicating the number of seconds until the following distance X becomes zero and the host vehicle contacts the preceding vehicle if the current traveling state continues, i.e., if the host vehicle speed Vh and the relative velocity Vr (=vehicle speed−speed of preceding vehicle) remain constant. The time to collision TTC with respect to the preceding vehicle is found using the Equation 1 shown below.

$$TTC = X/Vr \quad \text{(Equation 1)}$$

As the time to collision TTC becomes smaller, the collision with the preceding obstacle becomes more eminent and the degree of convergence with respect to the preceding obstacle becomes larger. For example, when approaching an obstacle, most drivers start taking action to decelerate before the time to collision TTC reaches 4 seconds or less. When an obstacle does not exist in front of the host vehicle, the time to collision TTC is infinity.

In step S302, the controller 50 determines if the time to collision TTC calculated in step S401 is smaller than a threshold value Th calculated. If the time to collision TTC is smaller than the threshold value Th (TTC<Th), then the controller 50 proceeds to step S303 and calculates a reference length L expressing the length of the imaginary elastic body 300. The reference length L is calculated using Equation 2 shown below based on the collision threshold value Th and the relative velocity Vr between the host vehicle and the preceding vehicle.

$$L = Th \times Vr \quad \text{(Equation 2)}$$

In step 304, the controller 50 uses the reference length L calculated in step S303 in Equation 3 shown below in order to calculate the risk potential RP of the host vehicle with respect to the preceding obstacle.

$$RP = K \times (L - X) \quad \text{(Equation 3)}$$

In the equation, the term K is the spring constant of the imaginary elastic member 300. Thus, the shorter the following distance X of the host vehicle with respect to the preceding obstacle becomes, the more the imaginary elastic body 300 is compressed and the risk potential RP increases.

If the result of step S302 is negative and the time to collision TTC is equal to or larger than Th, i.e., if the elastic body 300 is not contacting the preceding vehicle 200, as shown in diagram (a) of FIG. 9, the risk of contact between the host vehicle and the preceding vehicle is determined to be low and the controller 50 proceeds to step S305, where it sets the risk potential RP to 0.

Figure 11:
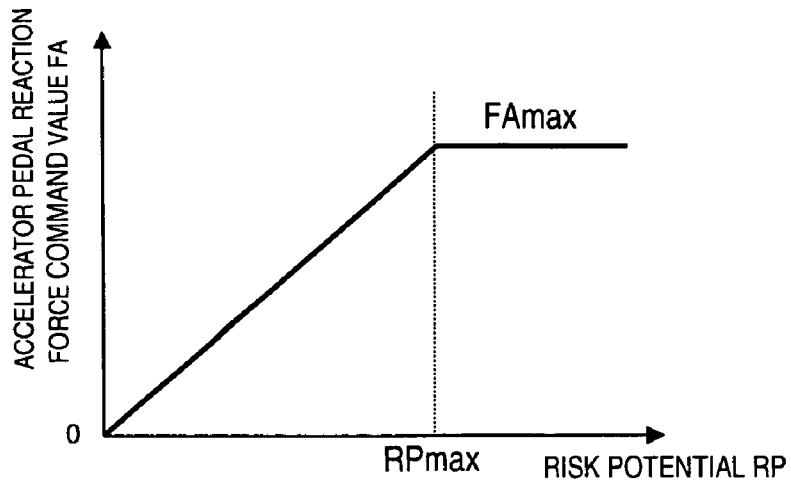
FIG. 11 is a graph plotting accelerator pedal reaction force control amount versus the risk potential.

After the controller 50 calculates the risk potential RP in step S300, the controller 50 proceeds to step S400. In step S400, the controller 50 calculates a reaction force control command value FA for the actuation reaction force to be exerted by (generated in) the accelerator pedal 72 based on the risk potential RP calculated in step S300. FIG. 11 is a plot of the accelerator pedal reaction force control command value FA versus the risk potential RP. As indicated in FIG. 11, when the risk potential is smaller than a prescribed maximum value RPmax, the accelerator pedal reaction force control command value FA is calculated such that the generated accelerator pedal reaction force increases as the risk potential RP increases. When the risk potential RP is larger than a prescribed maximum value RPmax, the accelerator pedal reaction force control command value FA is held constant at a maximum value FAmax such that a maximum accelerator pedal reaction force is generated.

Figure 12:
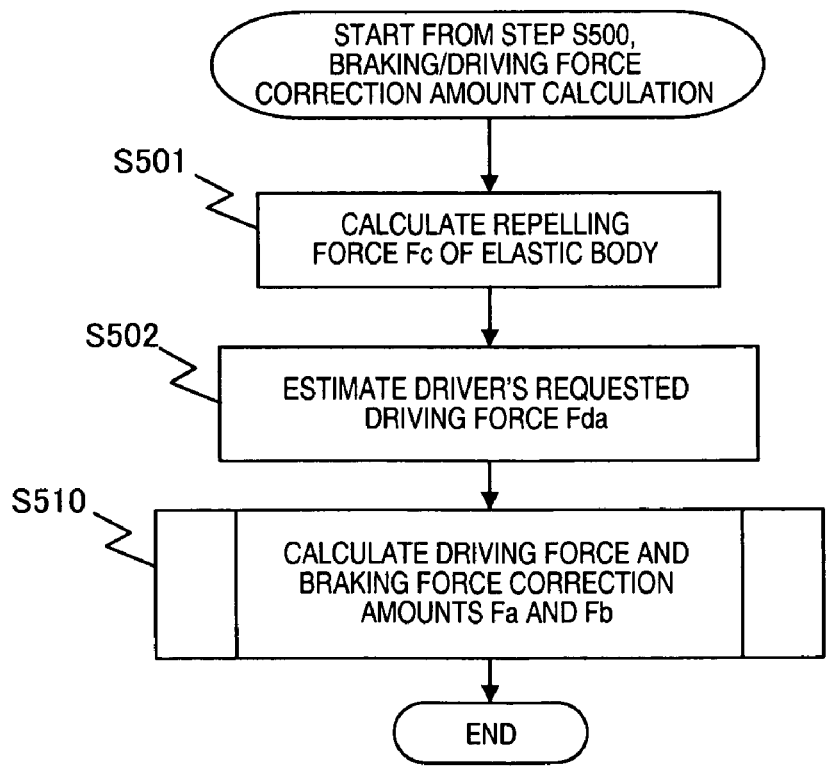
FIG. 12 is a flowchart for explaining the processing steps executed in order to calculate the driving force correction amount and the braking force correction amount.

In step S500, the controller 50 calculates a braking force correction amount and a driving force correction amount based on the risk potential RP calculated in step S300. The control processing executed in step S500 will now be explained with reference to the flowchart of FIG. 12.

Figure 13:
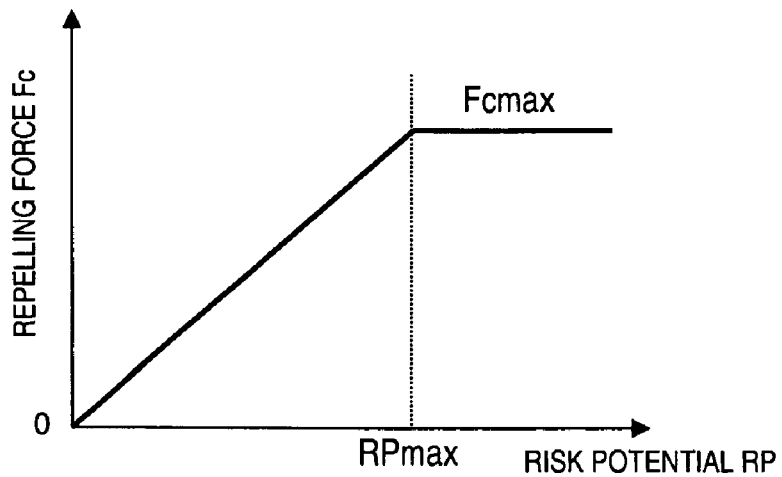
FIG. 13 is a graph plotting the repelling force versus the risk potential in accordance with the first embodiment of the present invention.

In step S501, based on the risk potential RP, the controller 50 calculates a repelling force Fc used for calculating the braking force and driving force correction amounts. The repelling force Fc can be thought of as the spring force of the imaginary elastic body 300 shown in diagrams (a) and (b) in FIG. 9. The repelling force Fc is calculated according to a relationship like that shown in FIG. 13 such that the larger the risk potential RP is, the larger the calculated value of the repelling force Fc becomes. When the risk potential RP exceeds a prescribed value RPm, the repelling force Fc becomes fixed at a maximum value Fcmax.

Figure 14:
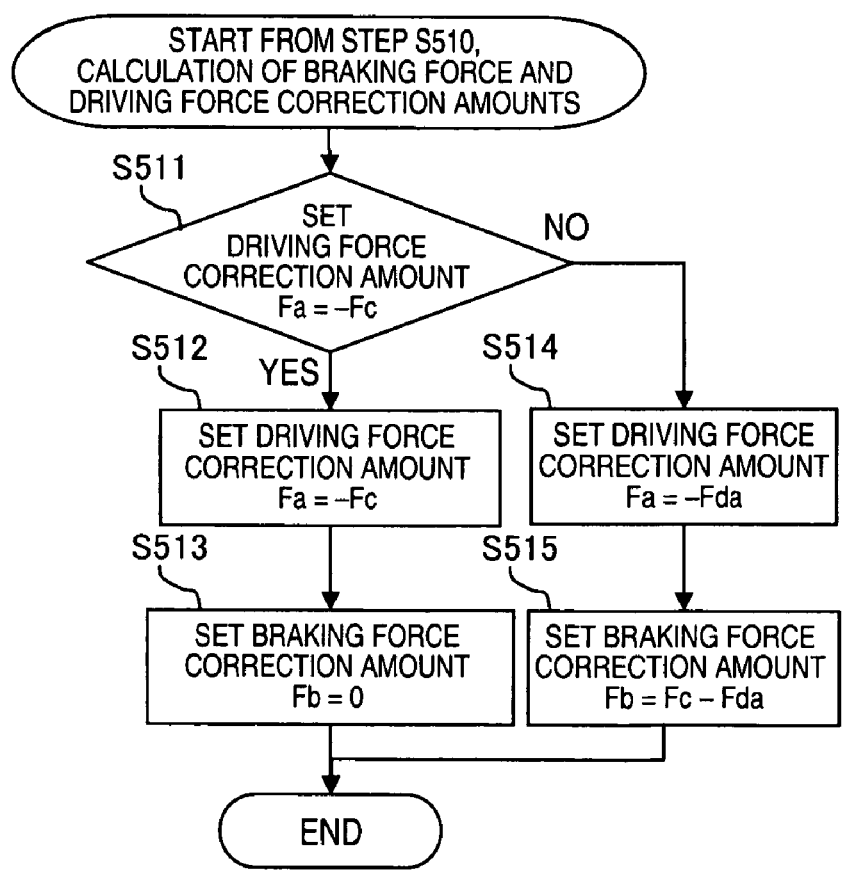
FIG. 14 is a flowchart for explaining the processing steps executed in order to calculate the driving force correction amount and the braking force correction amount.

In step S502, the controller 50 estimates the driver's requested driving force Fda. A map like that shown in FIG. 4 is stored in the controller 50 and the driver's requested driving force Fda is estimated based on the accelerator pedal actuation amount SA by referring to the map. In step S510, the controller 50 calculates the driving force correction amount Fa and the braking force correction amount Fb. The control processing executed in order to calculate the correction amounts Fa and Fb will now be explained with reference to the flowchart of FIG. 14.

In step S511, the controller 50 compares the driver's requested driving force Fda estimated in step S502 to the repelling force Fc calculated in step S501. If Fda is equal to or larger than Fc (Fda≧Fc), the controller 50 proceeds to step S512. In step S512, the controller 50 sets the driving force correction amount Fa to the value −Fc. The controller 50 then sets the braking force correction amount Fb to 0 in step S513.

In other words, since the difference Fda−Fc is equal to or larger than 0 (Fda−Fc≧0), a positive driving force will remain after the driving force Fda is corrected based on the repelling force Fc. Thus, the required correction amount output can be accomplished with only the driving force control device 73 outputting a correction amount. When this control is executed, the host vehicle will behave in such a fashion that the full driving force expected by the driver will not be delivered even though the driver is depressing the accelerator pedal 72. If the corrected driving force is larger than the running resistance, the driver will feel the vehicle exhibit more sluggish acceleration behavior. If the corrected driving force is smaller than the running resistance, then the driver will feel the vehicle decelerate.

Meanwhile, if the result of step S511 is negative, i.e., if driving force Fda is smaller than repelling force Fc (Fda<Fc), then the targeted correction amount cannot be obtained with output from the driving force control device 73 alone. Therefore, the controller 50 proceeds to step S514 and sets the driving force correction amount Fa to −Fda. Then, in step S515, the controller sets 50 sets the braking force correction amount Fb to the amount by which the correction amount Fa is insufficient (i.e., Fc−Fda). The driver perceives this control as deceleration behavior of the vehicle.

Figure 15:
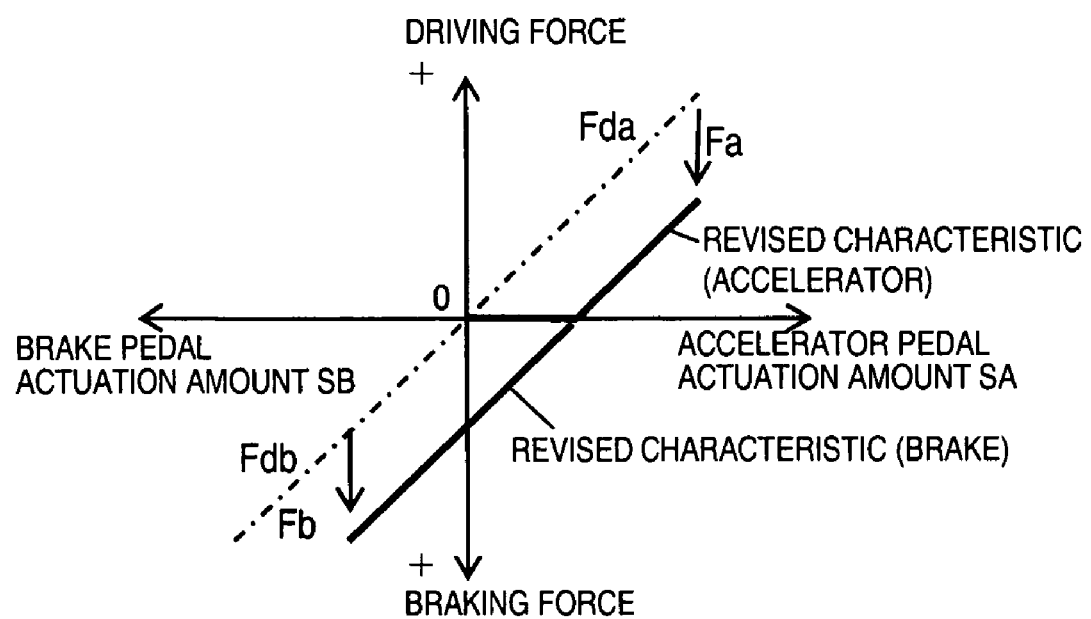
FIG. 15 is a graph plotting a characteristic curve for explaining how the driving force and the braking force are corrected.

FIG. 15 is a diagram for explaining the method of correcting the driving force and the braking force. The horizontal axis of FIG. 15 indicates the accelerator pedal actuation amount SA and the brake pedal actuation amount SB. The accelerator pedal actuation amount SA increases as one moves to the right from the origin 0 and the brake pedal actuation amount SB increases as one moves to the left from the origin 0. The vertical axis of FIG. 15 indicates the driving force and the braking force. The driving force increases as one moves upward from the origin 0 and the braking force increases as one moves downward from the origin 0. The single-dot chain line in FIG. 15 indicates the requested driving force Fda versus the accelerator pedal actuation amount SA and the requested braking force Fdb versus the brake pedal actuation amount SB. The corrected driving force and braking force (corrected based on the risk potential RP) are indicated with a solid line.

When the accelerator pedal actuation amount SA is large and the requested driving force Fda corresponding to the accelerator pedal actuation amount SA is equal to or larger than the repelling force Fc, the driving force is reduced by the correction amount Fa. Conversely, when the accelerator pedal actuation amount SA is small and the requested driving force Fda corresponding to the accelerator pedal actuation amount SA is smaller than the repelling force Fc, the correction amount Fa is set to such a value that the driving force will be reduced to zero and the driving force is corrected by the set correction amount Fa. Meanwhile, the difference between the repelling force Fc and the requested driving force Fda is set as the correction amount Fb. As a result, the light braking is executed in accordance with the accelerator pedal actuation amount SA.

When the brake pedal 92 is depressed, the braking force is corrected to a larger value based on the correction amount Fb. As a result, the braking/driving force characteristic is corrected in such a fashion that the total travel resistance of the vehicle is increased by an amount equivalent to the repelling force Fc of the imaginary elastic body.

In the first embodiment, a basic operating schedule for the braking/driving force control is established in advance. The operating schedule uses the correction amount Fa calculated based on the risk potential RP to correct the driving force versus accelerator pedal actuation amount SA characteristic such that the driving force corresponding to any given accelerator pedal actuation amount SA is reduced. The operating schedule uses the correction amount Fb calculated based on the risk potential RP to correct the braking force versus brake pedal actuation amount SB characteristic such that the braking force corresponding to any given brake pedal actuation amount SB is increased. FIG. 15 illustrates how the characteristic curves are corrected based on the correction amounts Fa and Fb. The basic operating schedule is contrived such that priority is given to driving force control and braking force control is executed only when the targeted deceleration rate corresponding to the risk potential RP cannot be obtained with driving force control alone. Basically, the control is shifted successively from acceleration suppression to engine braking, gradual deceleration, deceleration, and a combination of automatic braking and the driver operating the braking pedal (in order as listed) such that the deceleration is increased accordingly as the risk potential RP increases.

Figure 16:
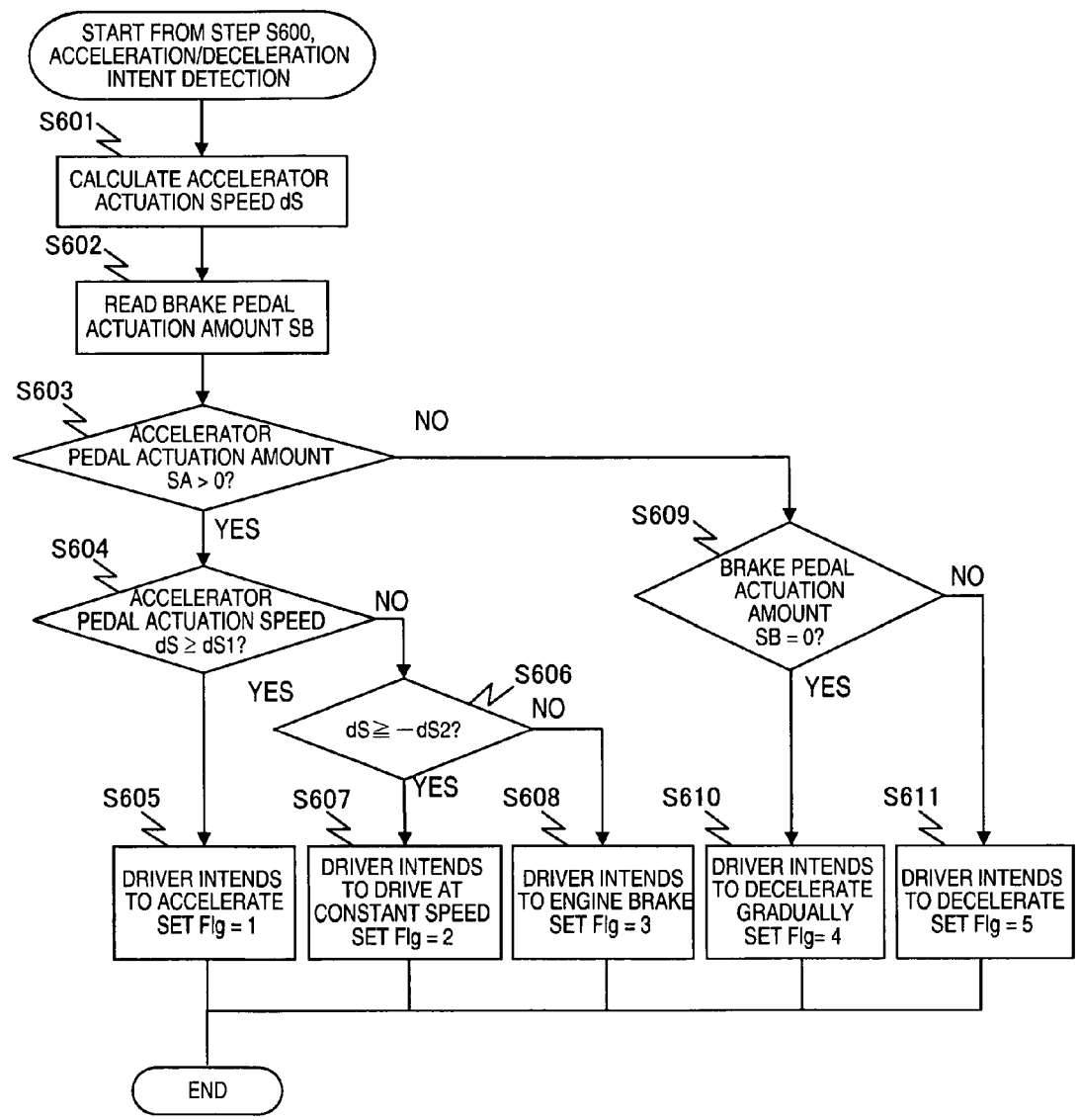
FIG. 16 is a flowchart for explaining the processing steps executed in order to detect the acceleration/deceleration intent in accordance with the first embodiment of the present invention.

After the controller 50 calculates the driving force correction amount Fa and the braking force correction amount Fb in step S500, the controller 50 proceeds to step S600. In step S600, the controller 50 detects the driver's intent regarding acceleration and deceleration based on the accelerator pedal actuation amount SA and the brake pedal actuation amount SB. The control processing executed in order to accomplish step S600 will now be explained with reference to the flowchart of FIG. 16.

In step S601, the controller 50 reads in the accelerator pedal actuation amount SA detected by the accelerator pedal stroke sensor 74 and calculates the accelerator pedal actuation speed dS. The accelerator pedal actuation speed dS can be calculated by, for example, finding the derivative of the accelerator pedal actuation amount SA with respect to time and expressing the accelerator pedal actuation speed dS such that it has a positive value when the accelerator pedal 72 is being operated in the depression direction. In step S602, the controller 50 also reads in the brake pedal actuation amount SB detected by the brake pedal stroke sensor 94.

In step S603, the controller 50 determines if the accelerator pedal actuation amount SA is larger than 0. If the accelerator pedal actuation amount SA is larger than 0, i.e., if the accelerator pedal 72 is being depressed, then the controller 50 proceeds to step S604 and determines if the accelerator pedal actuation speed dS is equal to or larger than a prescribed value. The prescribed value dS1 is set in advance to positive value that is appropriate for determining if the driver intends to accelerate based on the accelerator pedal actuation speed dS. If the accelerator pedal actuation speed dS is equal to or larger than the prescribed value dS1 (dS≧dS1), then the controller 50 proceeds to step S605 and sets the flag Flg to 1 (Flg=1) to indicate that it has been determined that the driver intends to accelerate.

If the result of step S604 is negative, the controller 50 proceeds to step S606 and determines if the accelerator pedal actuation speed dS is equal to or larger than the negative of another prescribed value dS2. The prescribed value dS2 is set in advance to a negative value that is appropriate for determining, based on the accelerator pedal actuation speed dS, if the driver intends to keep the vehicle speed substantially constant at the current speed Vh. If the accelerator pedal actuation speed dS is equal to or larger than the negative of the prescribed value dS2 (dS≧−dS2), then the controller 50 sets the value of the flag Flg to 2 (Flg=2) to indicate that it has been determined that the driver is attempting to keep the vehicle speed substantially constant at the current vehicle speed Vh. In other words, when the relationship dS1>dS>−dS2 exists, the controller determines that the driver intends to maintain the current vehicle speed Vh.

If the result of step S606 is negative, then the accelerator pedal 72 is being released at a speed equal to or larger than a prescribed speed and the controller 50 proceeds to step S608, where it sets the value of the flag Flg to 3 (Flg=3) to indicate that it has been determined that the driver intends to execute engine braking. Even when the result of step S606 is negative, it is possible that engine braking is not actually occurring because the accelerator pedal 72 is still depressed. However, since the accelerator pedal 72 is being released at or above the prescribed speed, it is reasonable to believe that the driver is hoping to reduce the vehicle speed Vh using engine braking. In short, if the accelerator pedal actuation speed dS is smaller than the negative of the prescribed value dS2 (dS<−dS2), then the controller 50 determines that the driver intends to execute engine braking.

If the result of step S603 is negative, i.e., if the accelerator pedal 72 is not being depressed, then the controller 50 proceeds to step S609 and determines if the brake pedal actuation amount SB is 0 (SB=0). If brake pedal actuation amount SB=0, i.e., if the brake pedal 92 is not being depressed, then the controller 50 proceeds to step S610 and sets the flag Flg to 4 (Flg=4) to indicate that it has been determined that the driver intends to decelerate gradually. Since the brake pedal 92 is not being depressed, the driver is not performing operations to decelerate the vehicle in an aggressive manner. On the other hand, since the accelerator pedal 72 is not being depressed, it is reasonable to believe that the driver hopes to decelerate at a higher rate than in the previously described situation in which the controller 50 determines that the driver intends to execute engine braking. In short, when neither the accelerator pedal 72 nor the brake pedal 92 is being depressed, the controller 50 determines that the driver intends to decelerate gradually.

If step S609 is negative, i.e., if the brake pedal 92 is being depressed, then the controller 50 proceeds to step S611 and sets the flag Flg to 5 (Flg=5) to indicate that it has been determined that the driver intends to decelerate. Thus, as the driver's intent to accelerate becomes stronger, the acceleration/deceleration intent determined by the controller 50 shifts successively from an intent to decelerate to an intent to decelerate gradually, an intent to execute engine braking, an intent to drive at a constant speed, and an intent to accelerate.

Figures 17, 18:
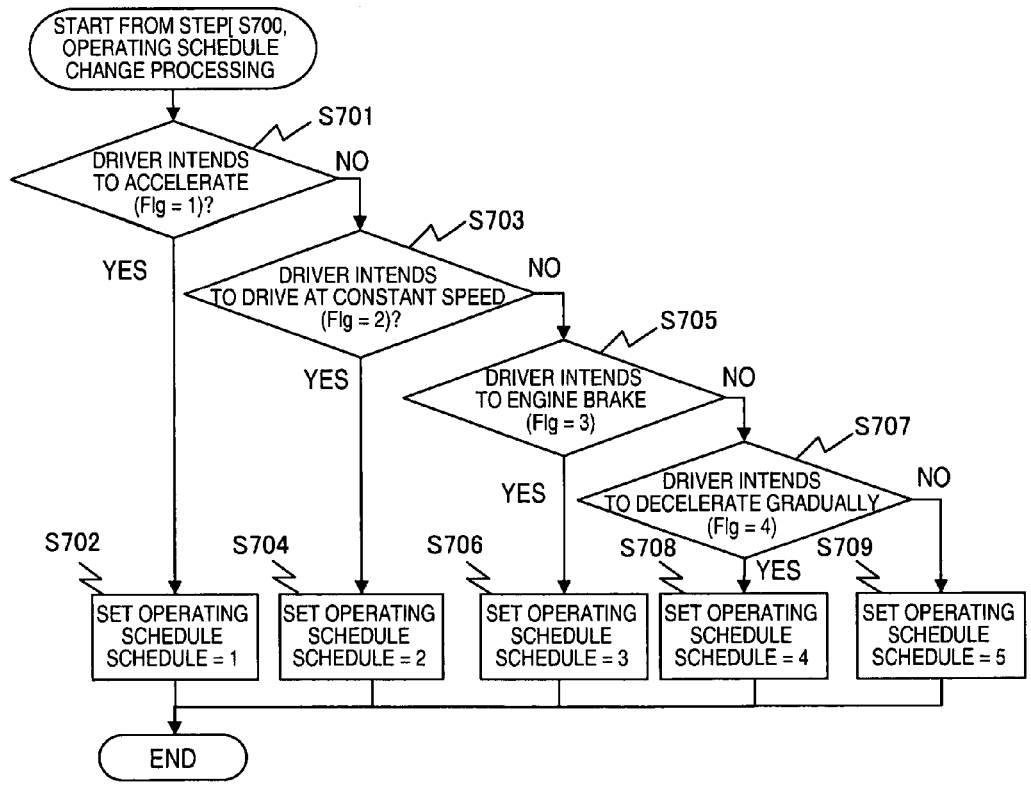
FIG. 17 is a table showing the relationship between the operating schedule and the acceleration/deceleration intent in accordance with the first embodiment of the present invention.
FIG. 18 is a flowchart for explaining the processing steps executed in order to accomplish the operating schedule change processing in accordance with the first embodiment of the present invention.

After the controller 50 estimates the driver's acceleration/deceleration intent in step S600, the controller 50 proceeds to step S700. In step S700, the controller 50 changes the operating schedule of the braking/driving force control. FIG. 17 shows the relationship between the acceleration/deceleration intent of the driver and the operating schedule. In the first embodiment, the operating schedule of the braking/driving force control is changed in accordance with the acceleration/deceleration intent of the driver.

More specifically, as shown in FIG. 17, the braking/driving force control is limited to acceleration suppression when the driver's intent is to accelerate. When the driver's intent is to drive at a constant speed, the braking/driving force control is limited to acceleration suppression and engine braking, i.e., braking/driving force control resulting in deceleration beyond engine braking is not permitted. When the driver's intend is to execute engine braking, the braking/driving force control is limited to acceleration suppression, engine braking, and gradual deceleration, i.e., braking/driving force control resulting in deceleration beyond gradual deceleration is not permitted. When the driver's intent is to decelerate gradually, the braking/driving force control is limited to acceleration suppression, engine braking, and gradual deceleration, and deceleration. When the driver's intent is to decelerate, the braking/driving force control is not limited and braking force control is executed by adding a correction amount based on the risk potential RP to the braking force resulting from the driver's operation of the brake pedal 92.

The control processing executed in order to change the operating schedule of the braking/driving force control will now be explained with reference to the flowchart of FIG. 18. In step S701, the controller 50 determines if the driver's intent detected in step S600 is to accelerate (Flg=1). If the driver's intent is to accelerate, then the controller 50 proceeds to step S702 and sets the operating schedule to 1 (Schedule=1) to permit acceleration suppression. If the result of step S701 is negative, then the controller 50 proceeds to step S703 and determines if the driver's intent is to drive at a constant speed (Flg=2). If the driver's intent is to drive at a constant speed, then the controller 50 proceeds to step S704 and sets the operating schedule to 2 (Schedule=2) to permit braking/driving force control resulting in deceleration up to and including engine braking.

If the result of step S703 is negative, then the controller 50 proceeds to step S705 and determines if the driver's intent is to execute engine braking (Flg=3). If the driver's intent is to execute engine braking, then the controller 50 proceeds to step S706 and sets the operating schedule to 3 (Schedule=3) to permit control up to and including gradual deceleration control ("light automatic brake control"). If the result of step S705 is negative, then the controller 50 proceeds to step S707 and determines if the driver's intent is to decelerate gradually (Flg=4). If the driver's intent is to decelerate gradually, then the controller 50 proceeds to step S708 and sets the operating schedule to 4 (Schedule=4) to permit control up to and including deceleration control ("agressive brake control"). If the result of step S707 is negative, then the controller 50 proceeds to step S709 and sets the operating schedule to 5 (Schedule=5) to permit the full range of braking/driving force control.

Figure 19:
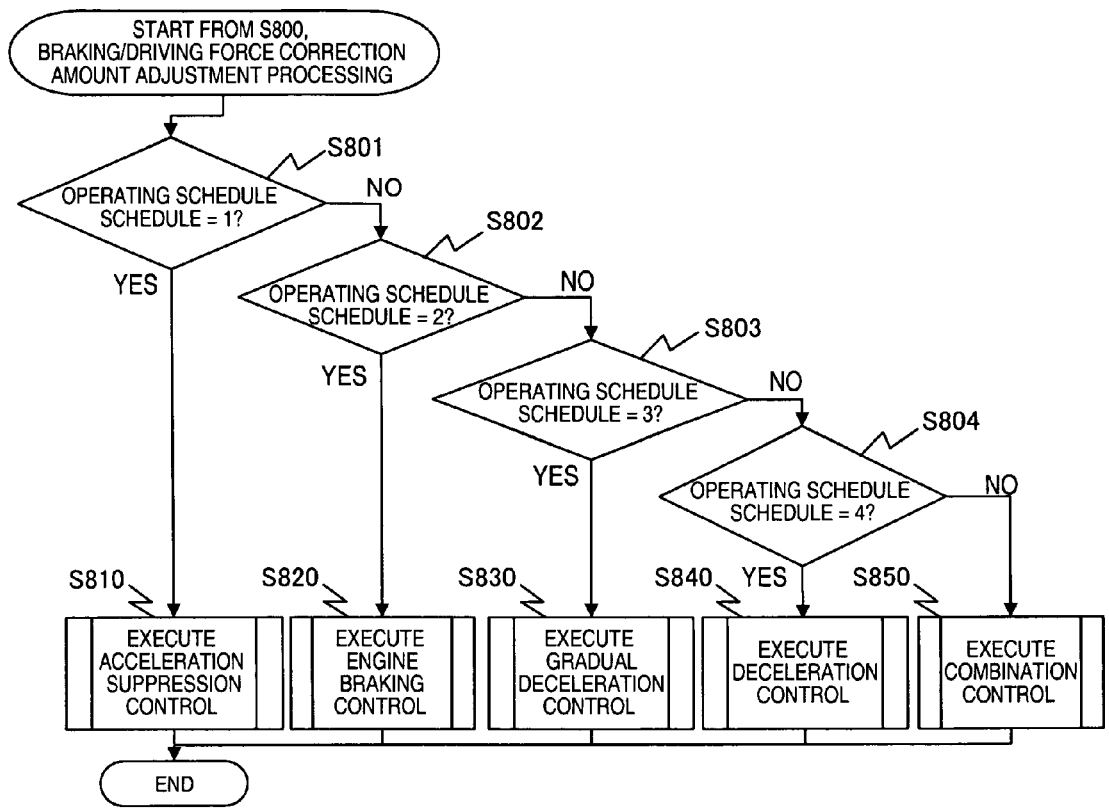
FIG. 19 is a flowchart for explaining the processing steps executed in order to adjust the braking force and driving force correction amounts in accordance with the first embodiment of the present invention.

After the controller 50 changes the operating schedule in step S700, the controller 50 proceeds to step S800. In step S800, the controller 50 changes the driving force correction amount Fa and the braking force correction amount Fb calculated in step S500 based on the operated schedule selected (changed to) in step S700. The control processing executed in order to change the correction amounts Fa and Fb will now be explained with reference to the flowchart of FIG. 19.

In step S801, the controller determines if the operating schedule has been set to 1 (Schedule=1). If the result of step S801 is positive, then the controller 50 proceeds to step S810 and executes acceleration suppression control. If the result of step S801 is negative, then the controller 50 proceeds to step S802 and determines if the operating schedule is set to 2 (Schedule=2). If the result of step S802 is positive, then the controller 50 proceeds to step S820 and executes engine braking control.

If the result of step S802 is negative, then the controller 50 proceeds to step S803 and determines if the operating schedule is set to 3 (Schedule=3). If the result of step S803 is positive, then the controller 50 proceeds to step S830 and executes gradual deceleration control. If the result of step S803 is negative, then the controller 50 proceeds to step S804 and determines if the operating schedule is set to 4 (Schedule=4). If the result of step S804 is positive, then the controller 50 proceeds to step S840 and executes deceleration control. If the result of step S804 is negative, then the controller 50 proceeds to step S850 and executes control for combining (adding together) braking force control with operation of the brake pedal 92 by the driver.

The acceleration suppression control of step S810, the engine braking control of step S820, the gradual deceleration control of step S830, the deceleration control of step S840, and the combination (sum) braking/driving control of step S850 will now be explained.

Figure 20:
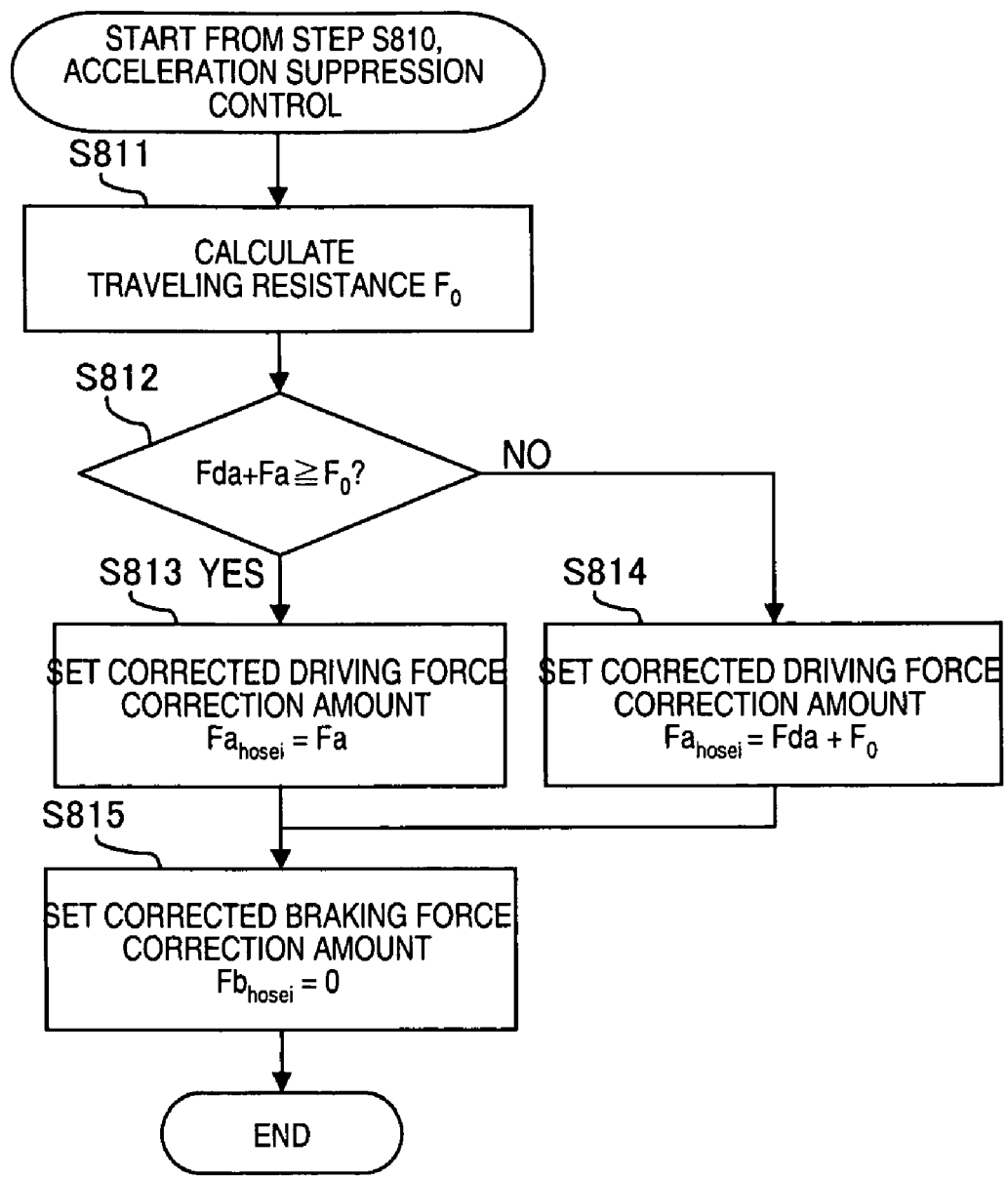
FIG. 20 is a flowchart showing the processing steps executed in order to accomplish acceleration suppression control in accordance with the first embodiment of the present invention.
Figure 21:
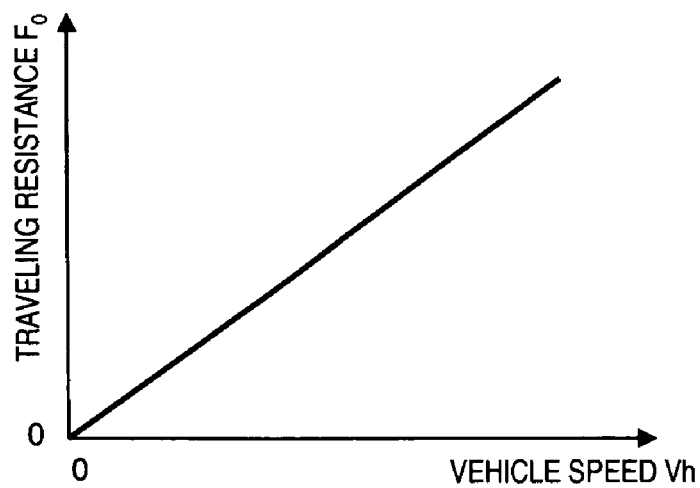
FIG. 21 is a graph plotting the running resistance versus the vehicle speed.

The acceleration suppression control executed in step S810 will now be explained with reference to the flowchart of FIG. 20. In step S811, the controller 50 calculates the running resistance $F_0$. The running resistance $F_0$ is calculated based on the vehicle speed Vh using the map shown in FIG. 21. The larger the vehicle speed Vh is, the larger the value to which the running resistance $F_0$ is set. The running resistance $F_0$ can also be calculated using another method based on, for example, the acceleration and/or the weight of the vehicle.

In step S812, the controller 50 determines if the value (Fda+Fa) obtained by adding the requested driving force Fda corresponding to the accelerator pedal actuation amount SA to the driving force correction amount Fa is equal to or larger than the running resistance $F_0$ calculated in step S811. If the sum value is equal to or larger than the running resistance $F_0$ (Fda+Fa$\geq F_0$), then the controller 50 proceeds to step S813. In step S813, the controller sets a corrected driving force correction amount $Fa_{hosei}$ to Fa. If the sum value is smaller than the running resistance $F_0$ (Fda+Fa$\geq F_0$), then the controller 50 proceeds to step S814 and sets the corrected driving force correction amount $Fa_{hosei}$ to the sum value−Fda+$F_0$ ($Fa_{hosei}$=−Fda+$F_0$). In step S815, the controller 50 sets the corrected braking force correction amount $Fb_{hoesi}$ to 0 ($Fb_{hosei}$=0).

Figure 22:
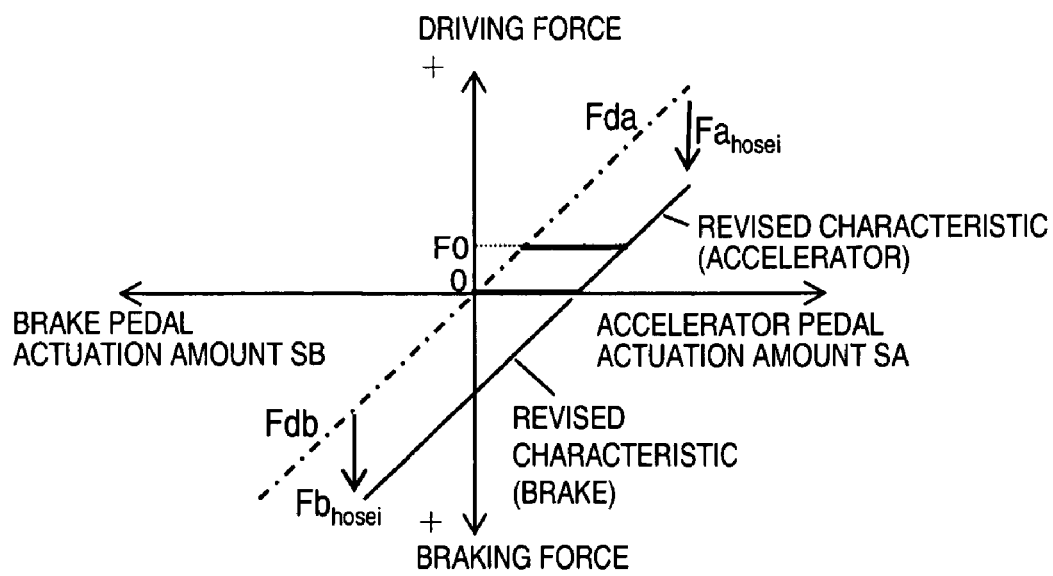
FIG. 22 is a graph plotting a characteristic curve for explaining how the driving force characteristic and the braking force characteristic change when the operating schedule is changed.

As a result, as shown in FIG. 22, the lower limit value of the driving force during driving force control executed based on the risk potential RP is limited to a value equivalent to the running resistance $F_0$. In other words, when correction control is executed so as to reduce the driving force while the operating schedule is set to 1 (Schedule=1), the correction control is limited such that, at a minimum, a driving force equivalent to the running resistance $F_0$ is exerted against the vehicle. As a result, a braking/driving force control that suppresses the acceleration of the vehicle is accomplished.

Figure 23:
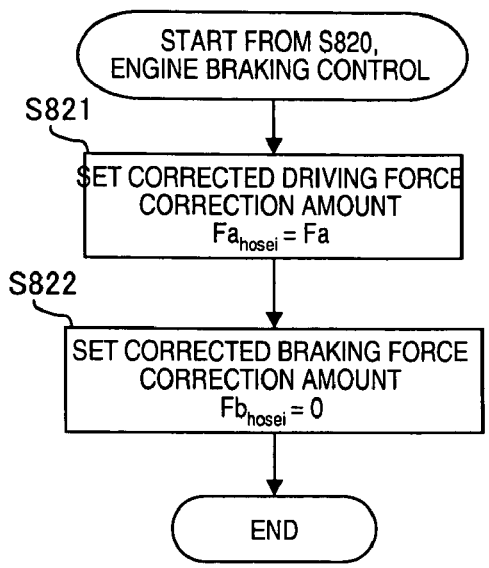
FIG. 23 is a flowchart for explaining the processing steps executed in order to accomplish the engine braking control.

The engine braking control executed in step S820 will now be explained with reference to the flowchart of FIG. 23. In step S821, the controller 50 sets the corrected driving force correction amount $Fa_{hoesi}$ to the value of the driving force correction amount Fa ($Fa_{hoesi}$=Fa). In step S822, the controller 50 sets the corrected braking force correction amount $Fb_{hosei}$ to 0 ($Fb_{hosei}$=0). As a result, as shown in FIG. 22, the lower limit of the driving force is set to 0 and, thus, the braking/driving force control can be executed such that driving force is reduced to 0. However, generation of a braking force is not permitted. As a result, when the operating schedule is set to 2 (Schedule=2), braking/driving force control that decelerates the vehicle to the degree that can be obtained with engine braking is accomplished.

Figure 24:
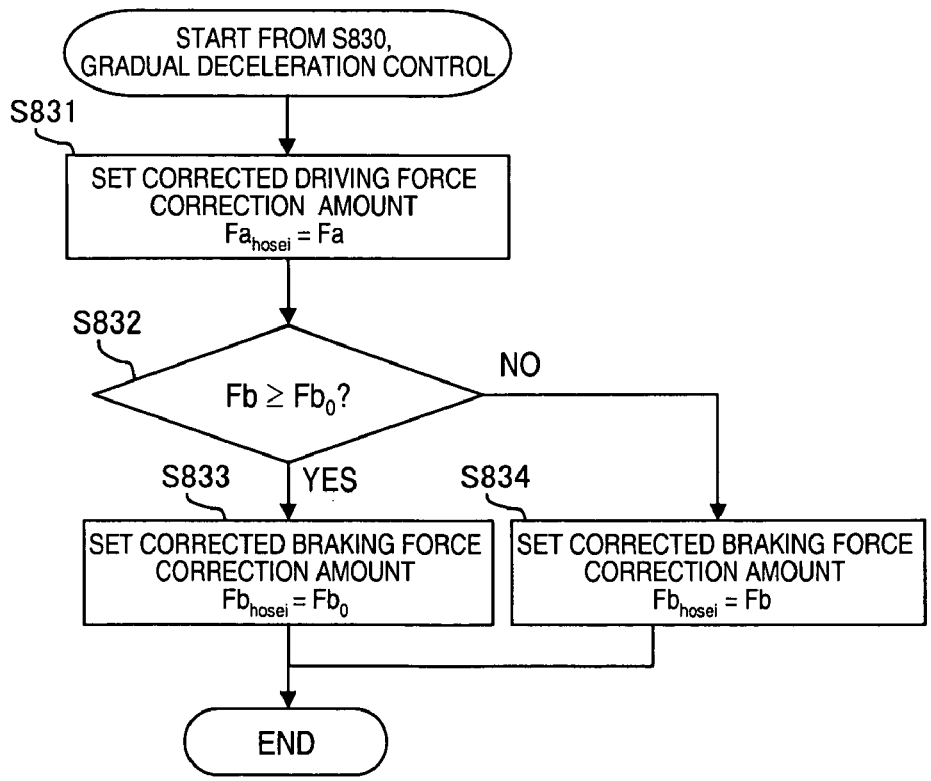
FIG. 24 is a flowchart showing the processing steps executed in order to accomplish the gradual deceleration control.

The gradual deceleration control executed in step S830 will now be explained with reference to the flowchart of FIG. 24. In step S831, the controller 50 sets the corrected driving force correction amount $Fa_{hosei}$ to the value of the driving force correction amount Fa ($Fa_{hosei}$=Fa). In step S832, the controller 50 determines if the braking force correction amount Fb is equal to or larger than a prescribed value $Fb_0$. The prescribed value $Fb_0$ is set in advance to an appropriate braking force value for achieving a gradual deceleration equivalent to the deceleration that could be obtained by downshifting. If the braking force correction amount Fb is larger than or equal to the prescribed value $Fb_0$ (Fb$\geq Fb_0$), then the controller 50 proceeds to step S833 and sets the corrected braking force correction amount $Fb_{hosei}$ to the prescribed value $Fb_0$ ($Fb_{hosei}$=$Fb_0$). In other words, the braking force correction amount Fb is limited to the prescribed value $Fb_0$. If the braking force correction amount Fb is smaller than the prescribed value $Fb_0$ (Fb<$Fb_0$), then the controller 50 proceeds to step S834 and sets the corrected braking force correction amount $Fb_{hosei}$ to the braking force correction amount Fb ($Fb_{hosei}$=Fb).

Thus, when the operating schedule is set to 3 (Schedule=3), the braking force that can be achieved during braking force control executed based on the risk potential RP is limited to the sum of the driver's requested braking force Fdb and the prescribed value $Fb_0$. In other words, when correction control is executed so as to increase the braking force while the operating schedule is set to 3, the amount by which the braking force can be increased is limited to the prescribed amount $Fb_0$. As a result, a braking/driving force control that allows gradual deceleration of the vehicle is accomplished.

Figure 25:
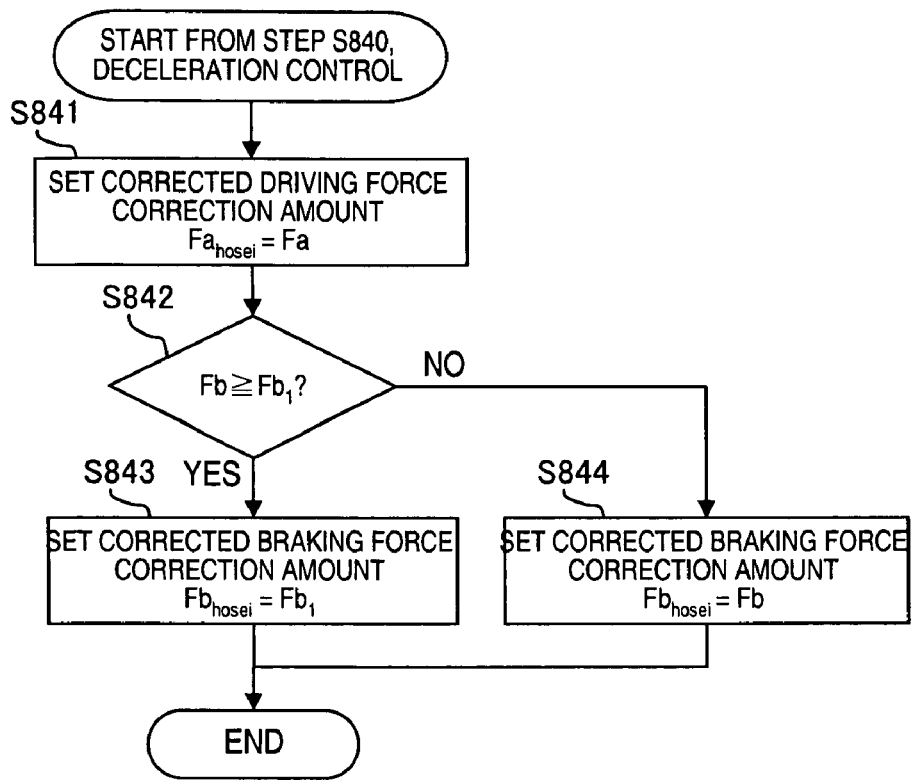
FIG. 25 is a flowchart showing the processing steps executed in order to accomplish the deceleration control.

The gradual deceleration control executed in step S840 will now be explained with reference to the flowchart of FIG. 25. In step S841, the controller sets the corrected driving force correction amount $Fa_{hosei}$ to the value of the driving force correction amount Fa ($Fa_{hosei}$=Fa). In step S842, the controller 50 determines if the braking force correction amount Fb is equal to or larger than a prescribed value $Fb_1$. The prescribed value $Fb_1$ is set in advance to an appropriate value that is larger than the prescribed value $Fb_0$ used for gradual deceleration control and within a range of braking forces that are normally obtained when a driver operates the brake pedal 92. If the braking force correction amount Fb is larger than or equal to the prescribed value $Fb_1$ (Fb≧$Fb_1$), then the controller 50 proceeds to step S843 and sets the corrected braking force correction amount $Fb_{hosei}$ to the prescribed value $Fb_1$, ($Fb_{hosei}$=$Fb_1$). In other words, the braking force correction amount Fb is limited to the prescribed value $Fb_1$. If the braking force correction amount Fb is smaller than the prescribed value $Fb_1$ (Fb<$Fb_1$), then the controller 50 proceeds to step S844 and sets the corrected braking force correction amount $Fb_{hosei}$ to the braking force correction amount Fb ($Fb_{hosei}$=Fb).

As a result, when the operating schedule is set to 4 (Schedule=4), the braking force that can be achieved during braking force control executed based on the risk potential RP is limited to the sum of the driver's requested braking force Fdb and the prescribed value $Fb_1$. In other words, when correction control is executed so as to increase the braking force while the operating schedule is set to 4, the amount by which the braking force can be increased is limited to the prescribed amount $Fb_1$.

Figure 26:
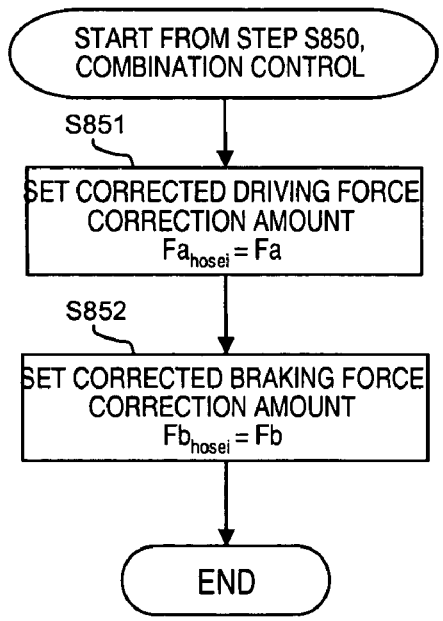
FIG. 26 is a flowchart showing the processing steps executed in order to combine driver braking and braking control.

The combining control executed in step S850 will now be explained with reference to the flowchart of FIG. 26. In step S8251, the controller sets the corrected driving force correction amount $Fa_{hosei}$ to the value of the driving force correction amount Fa ($Fa_{hosei}$=Fa). In step S852, the controller sets the corrected braking force correction amount $Fb_{hosei}$ to Fb ($Fb_{hosei}$=Fb). As a result, as shown in FIG. 22, when braking force control is executed based on the risk potential RP while the operating schedule is set to 5 (Schedule=5), the braking force generated is the sum of the driver's requested braking force Fdb and the braking force correction amount Fb determined based on the risk potential RP.

After the controller 50 completes the braking/driving force correction amount adjustment processing in step S800, the controller 50 proceeds to step S900. In step S900, the controller 50 sends the accelerator pedal reaction force control command value FA calculated in step S400 to the accelerator pedal reaction force control device 70. The accelerator pedal reaction force control device 70 controls the actuation reaction force exerted by the accelerator pedal 72 based on the command value received from the controller 50.

In step S1000, the controller 50 sends the corrected driving force correction amount $Fa_{hosei}$ and the corrected braking force correction amount $F_{hosei}$ calculated in step S800 to the driving force control device 73 and the braking force control device 93, respectively. The driving force control device 73 calculates a target driving force based on the corrected driving force correction amount $Fa_{hosei}$ and the requested driving force Fda and controls the engine controller such that the calculated target driving force is generated. Meanwhile, the braking force control device 93 calculates a target braking force based on the corrected braking force correction amount $F_{hosei}$ and the requested braking force Fdb and controls the brake fluid pressure controller such that the target braking force is generated. After the command values are sent, the current control loop ends.

The first embodiment described heretofore can thus provide the following operational effects.

The vehicle driving assist system 1 is configured to detect an obstacle existing in front of the vehicle in which the system 1 is installed and calculate a risk potential RP of the vehicle with respect to the preceding obstacle based on the preceding obstacle detection results. The system 1 is also configured to calculate correction amounts Fa and Fb for the driving force and braking force exerted against the vehicle based on the risk potential RP and, based on the calculated correction amounts Fa and Fb, to control the driving force and the braking force exerted against the vehicle in accordance with a preset operating schedule. The controller 50 of the vehicle driving assist system 1 is configured to detect the intent of the driver regarding acceleration and deceleration of the vehicle and, based on the detected intent, to change the operating schedule of the braking/driving force control. As a result, the risk potential RP with respect to an obstacle can be conveyed to the driver by a change in the braking force and/or driving force exerted against the vehicle. Furthermore, by changing the operating schedule of the braking/driving force control based on the intent of the driver regarding acceleration and deceleration, the driver can be urged to change (adjust) his or her operation of the vehicle in an appropriate manner without obstructing the driver's ability to accelerate or decelerate as intended.

The operating schedule is set in such that the system proceeds in a successive fashion in accordance with the risk potential from executing driving force control to executing braking force control. More specifically, the operating schedule is set such that when the accelerator pedal 72 is being operated, the system 1 executes driving force control alone in accordance with the risk potential RP when the risk potential RP is small and adds braking force control to the driving force control as the risk potential RP increases. If it is detected that the driver intends to accelerate, then the controller 50 changes the operating schedule such that only driving force control is executed. As a result, when the driver is attempting to accelerate, the system 1 can be prevented from decelerating the vehicle in opposition to the driver's intent.

The operating schedule is set such that the system 1 proceeds in an successive fashion in accordance with the risk potential RP from acceleration suppression, to engine torque reduction, to gradual deceleration, and, finally, to braking. Based on the driver's intent with respect to acceleration and deceleration (acceleration/deceleration intent), the controller 50 changes the schedule such that only acceleration suppression is executed when the driver is attempting to accelerate and engine torque reduction, gradual deceleration, and braking are successively added to the acceleration suppression as the driver's intent to accelerate decreases. More specifically, as shown in FIG. 17, as the driver's intent to accelerate decreases successively from an intent to accelerate to an intent to drive at a constant speed, an intent to engine brake, an intent to decelerate gradually, and an intent to decelerate, the operating schedule is changed successively from acceleration suppression alone to a combination of acceleration suppression and engine torque reduction, acceleration suppression and gradual deceleration, and acceleration suppression and braking, respectively. In this embodiment, engine braking control is equivalent to engine torque reduction and the sum (combination) of braking control and brake operation by the driver is equivalent to braking. As a result, when the driver is attempting to accelerate, the system 1 can be prevented from decelerating the vehicle in opposition to the driver's intent. Meanwhile, when the driver is aggressively performing an operation(s) to decelerate the vehicle, the system 1 can execute brake control so as to assist in the driver's attempt to decelerate.

The controller 50 is configured to detect the acceleration/deceleration intent of the driver as an intent to accelerate, an intent to drive at a constant speed, an intent to engine brake, an intent to decelerate gradually, or an intent to decelerate. As a result, the braking/driving force control can be finely adjusted in accordance with the driver's intent regarding acceleration and deceleration.

The vehicle driving assist system 1 is configured to detect the accelerator pedal actuation amount SA and the brake pedal actuation amount SB resulting from the driver's operation of the accelerator pedal 72 and the brake pedal 92, respectively. The controller 50 detects the driver's intent regarding acceleration and deceleration based on the accelerator pedal actuation amount SA and the brake pedal actuation amount SB. Since the accelerator pedal 72 and the brake pedal 92 are driving operation devices that are operated by the driver in order to accelerate and decelerate the vehicle, the controller 50 can detect the driver's intent regarding acceleration and deceleration in a direct manner based on the operating states of these devices.

Second Embodiment

A vehicle driving assist system in accordance with a second embodiment of the present invention will now be explained. The basic constituent features of a vehicle driving assist system in accordance with the second embodiment are the same as those of the first embodiment shown in FIGS. 1 and 2. The second embodiment will be explained chiefly by describing its differences with respect to the first embodiment.

Figure 27:
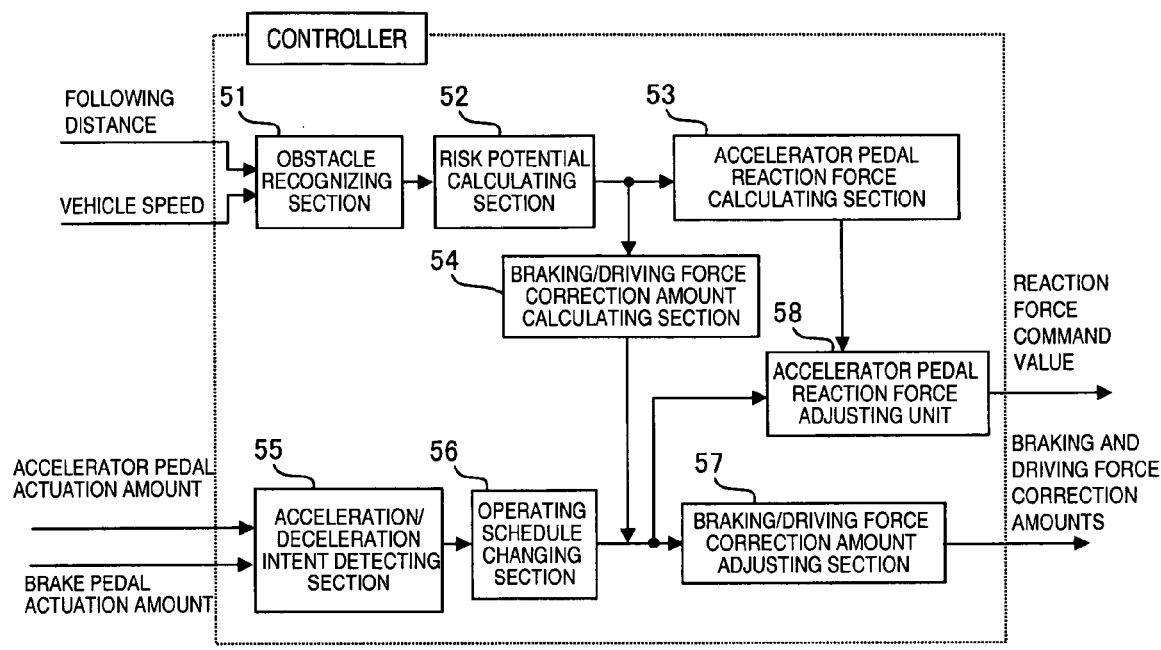
FIG. 27 is a block diagram showing the internal components of the controller of a second embodiment.

In the second embodiment, the system 1 also changes the actuation reaction force exerted by the accelerator pedal 72 (which is set in accordance with the risk potential RP) based on the driver's intent regarding acceleration and deceleration (acceleration/deceleration intent). As shown in FIG. 27, the controller 50A of a vehicle driving assist system 1 in accordance with the second embodiment includes the obstacle recognizing section 51, the risk potential calculating section 52, the accelerator pedal reaction force calculating section 53, the braking/driving force correction amount calculating section 54, the acceleration/deceleration intent detecting section 55, the operating schedule changing section 56, and the braking/driving force correction amount adjusting section 57 from the first embodiment, and adds an accelerator pedal reaction force adjusting section 58.

The accelerator pedal reaction force adjusting section 58 is configured to adjust the reaction force control command value FA (which is calculated by the accelerator pedal reaction force calculating section 53) in accordance with the selected mode of the operating schedule and the adjusted reaction force control command value is sent to the accelerator pedal reaction force control device 70.

Figure 28:
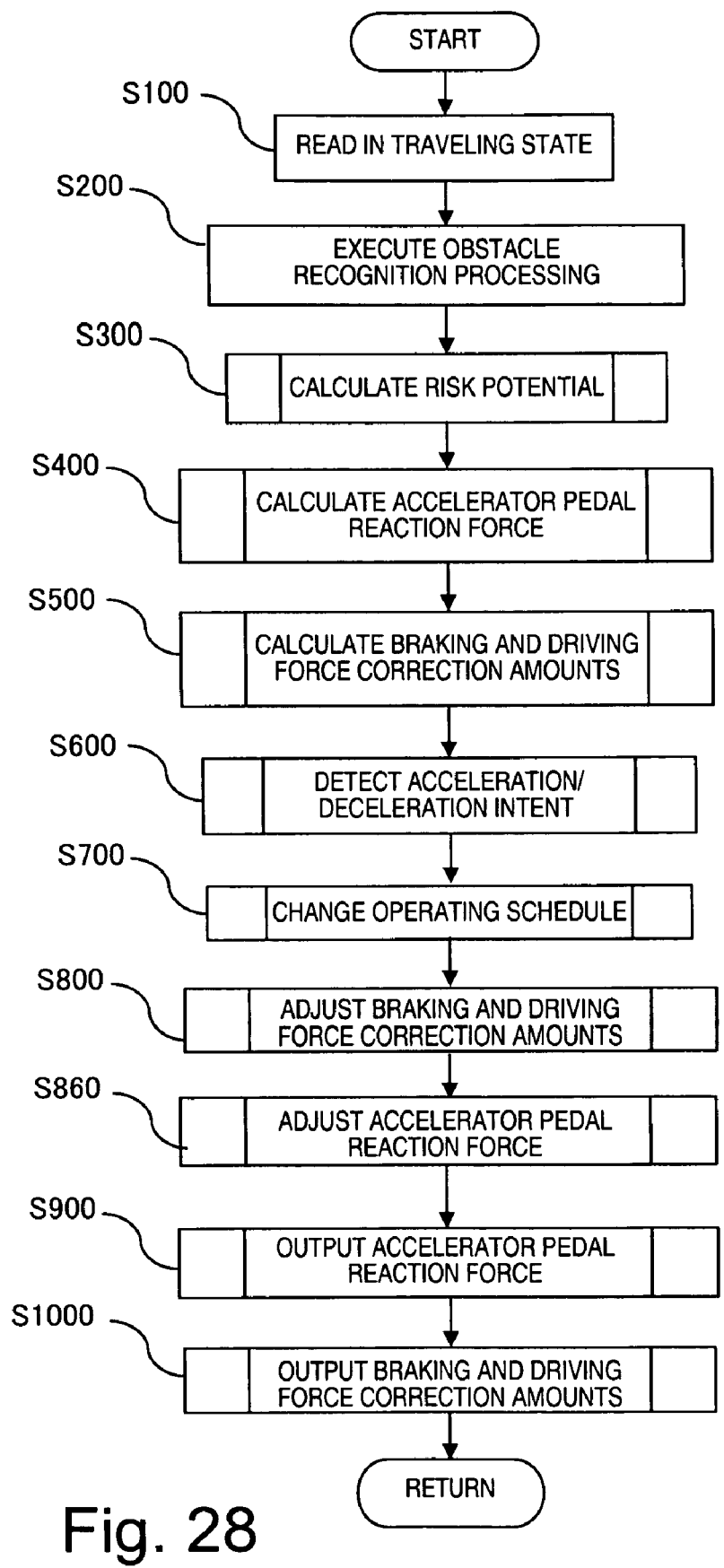
FIG. 28 is a flowchart showing the processing steps of a driving assistance control program in accordance with the second embodiment.

The operation of a vehicle driving assist system 1 in accordance with the second embodiment will now be explained with reference to FIG. 28. FIG. 28 is a flowchart showing the control processing steps of the driving assistance control executed by the controller 50A in the second embodiment. This control loop is executed continuously once per prescribed time period, e.g., every 50 msec. The control processing of the steps S100 to S800 is the same as in the flowchart shown in FIG. 8 and explanations of those steps are omitted for the sake of brevity.

Figure 29:
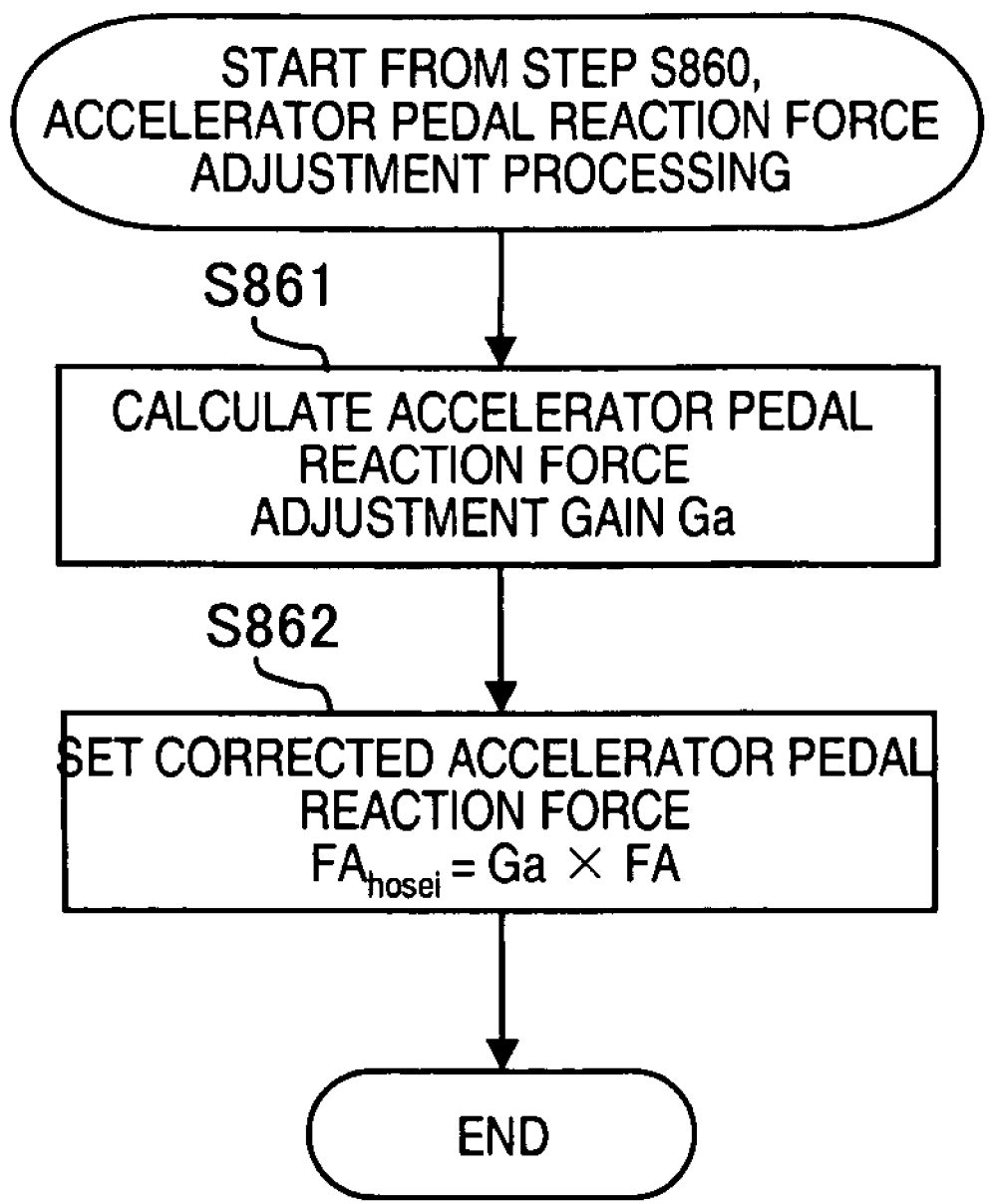
FIG. 29 is a flowchart for explaining the processing steps executed in order to adjust the accelerator pedal reaction force.
Figure 30:
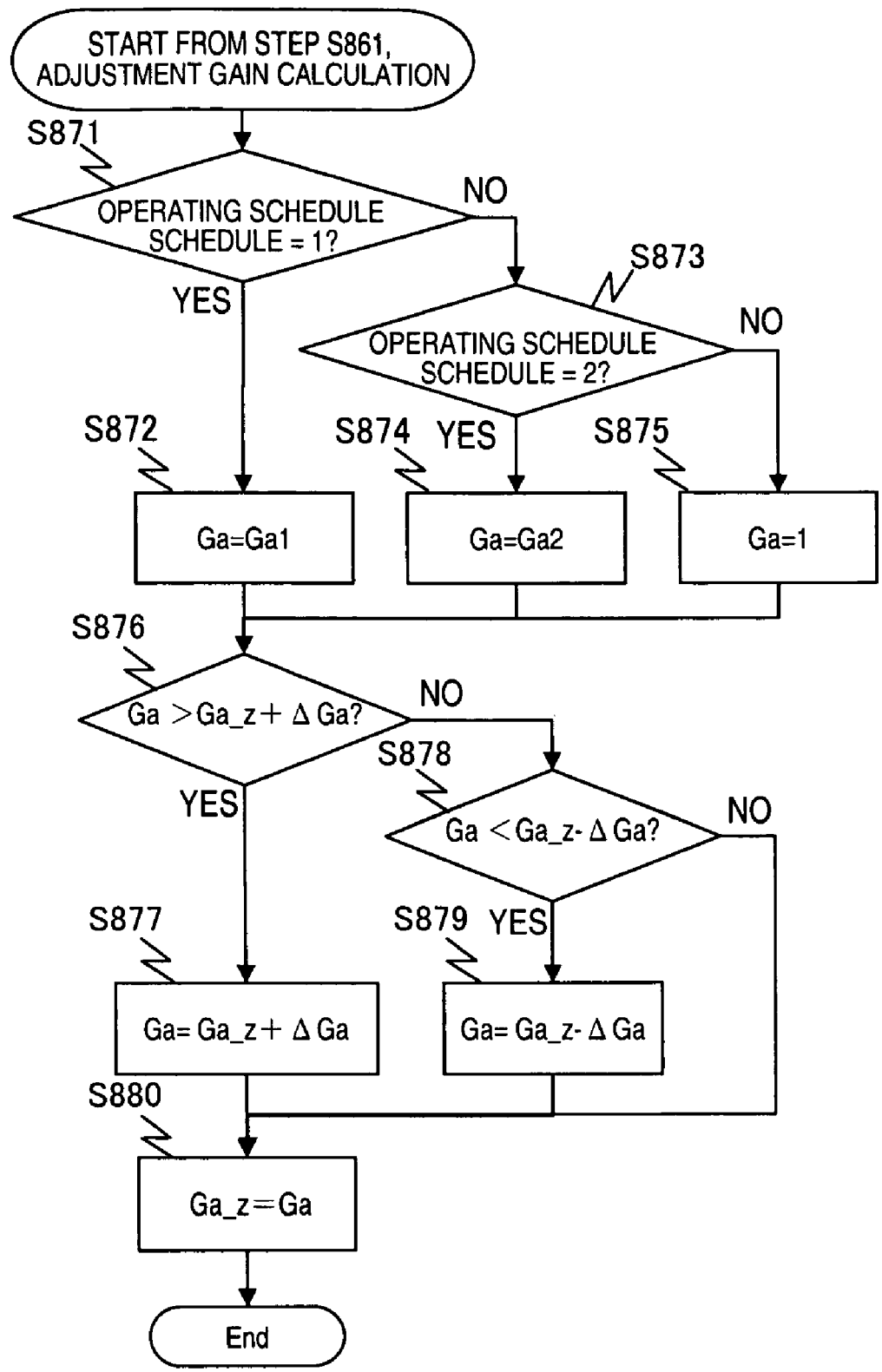
FIG. 30 is a flowchart for explaining the processing steps executed in order to calculate the accelerator pedal reaction force adjustment gain.

In step S860, the controller adjusts the accelerator pedal reaction force control command value FA calculated in step S400. The adjustment is based on the operating schedule selected in step S700. The control processing executed in order to accomplish step S860 will now be explained with reference to the flowchart of FIG. 29. In step S861, the controller calculates a reaction force adjustment gain Ga for adjusting the accelerator pedal reaction force control command value FA. The control processing executed in order to calculate the reaction force adjustment gain Ga will now be explained with reference to the flowchart of FIG. 30.

In step S871, the controller determines if the operating schedule has been set to 1 (Schedule=1). If Schedule=1 is set, then the controller 50A proceeds to step S872 and sets the reaction force adjustment gain Ga to Ga1 (Ga=Ga1). If the result of step S871 is negative, then the controller 50A proceeds to step S873 and determines if the operating schedule is set to 2 (Schedule=2). If Schedule=2 is set, then the controller 50A proceeds to step S874 and sets the reaction force adjustment gain Ga to Ga2 (Ga=Ga2). If the result of step S873 is negative, then the controller 50A proceeds to step S875 and sets the reaction force adjustment gain Ga to 1 (Ga=1). Thus, the values Ga1 and Ga2 are set to appropriate values in advance and satisfy the relationship Ga1>Ga2>1.

When the operating schedule is set to 1 (Schedule=1) or 2 (Schedule=2), i.e., when the driver intends to accelerate or drive at a constant speed, the reaction force adjustment gain Ga is set to a value Ga1 or Ga2 that is larger than 1. As a result, the actuation reaction force exerted by the accelerator pedal 72 is strengthened. When the operating schedule is set to neither 1 nor 2, i.e., when the driver intends to lower the vehicle speed Vh, the reaction force adjustment gain is set 1 such that the actuation reaction force calculated based on the risk potential RP is generated as is (i.e., without being adjusted).

In step S876, the controller 50A determines if the reaction force adjustment gain Ga set in step S872, S874, or S875 is larger than the sum of the value Ga_z of the reaction force adjustment gain calculated in the previous control cycle and a prescribed change amount $\Delta$Ga. If the gain Ga is larger than the sum (Ga>Ga_z+$\Delta$Ga), then the controller 50A proceeds to step S877 and sets the reaction force adjustment gain Ga to the value of the sum (Ga=Ga_z+$\Delta$Ga). In this way, the rate of change of the reaction force adjustment gain Ga is limited.

If the result of step S876 is negative, i.e., if Ga$\leq$Ga_z+$\Delta$Ga, then the controller 50A proceeds to step S878. In step S878, the controller 50A determines if the reaction force adjustment gain Ga is smaller than the difference between the value Ga_z of the reaction force adjustment gain calculated in the previous control cycle and the prescribed change amount $\Delta$Ga. If the gain Ga is smaller than the difference (Ga<Ga_z−$\Delta$Ga), then the controller 50A proceeds to step S879 and sets the reaction force adjustment gain Ga to the value of the difference (Ga=Ga_z+$\Delta$Ga). In this way, the rate of change of the reaction force adjustment gain Ga is limited.

If the result of step S878 is negative, then the reaction force adjustment gain Ga set in step S872, S874, or S875 is used as is. In step S880, the reaction force adjustment gain Ga set in step S872, S874, or S875 is set as the previous-cycle value Ga_z.

After the controller 50A calculates the accelerator pedal reaction force adjustment gain Ga in step S861, the controller 50A proceeds to step S862. In step S862, the controller 50A uses the reaction force adjustment gain Ga calculated in step S861 to adjust the accelerator pedal reaction force control command value FA calculated in step S400 The adjusted reaction force control command value $FA_{hosei}$ is expressed as shown in the Equation 4 below.

$$FA_{hosei} = Ga \times FA \qquad \text{(Equation 4)}$$

As a result, when the driver's intent is to accelerate or to drive at a constant speed (i.e., when the operating schedule is set to 1 or 2), the accelerator pedal reaction force control command value FA is corrected (adjusted) to a larger value such that the actuation reaction force exerted by the accelerator pedal 72 is strengthened. Conversely, when the driver's intent is not to accelerate or to drive at a constant speed (operating schedule is other than 1 or 2), i.e., when the driver is attempting to lower the vehicle speed Vh, the accelerator pedal reaction force control command value FA calculated based on the risk potential RP is used as is to control the generated reaction force.

The second embodiment just described can provide the following operational effects in addition to the effects provided by the first embodiment.

The controller 50A is configured to calculate an actuation reaction force FA to be generated by a driver-operated driving operation device based on the risk potential RP and to correct (adjust) the actuation reaction force FA based on the selected operating schedule. The controller 50A then executes control that causes the driver-operated driving operating device to exert the corrected actuation reaction force $FA_{hosei}$. As a result, when the driving assistance system is configured to convey the risk potential RP to the driver as an actuation reaction force exerted by a driver-operated driving operation device, the actuation reaction force control can be coordinated with the braking/driving force control so as to achieve an effective driving assistance control.

The controller 50A is configured to correct the actuation reaction force to a larger value when the driving conditions are such that the operating schedule is changed to allow only acceleration suppression. Thus, the actuation reaction force exerted by the driver-operated driving operation device can be strengthened (emphasized) when the braking/driving force control is limited such that only acceleration suppression is executed due to the driver having an intent to accelerate. As a result, the odd feeling imparted to the driver can be reduced while also conveying information to the driver in a reliable manner.

In the first and second embodiments, the driver's intent regarding acceleration and deceleration is detected as any one of an intent to accelerate, an intent to drive at a constant speed, an intent to execute engine braking, an intent to decelerate gradually, and an intent to decelerate. However, the invention is not limited to these categories of intent and a system in accordance with the present invention can be achieved so long as it is configured to detect at least whether or not the driver intends to accelerate. Additionally, in the first and second embodiments, the operating schedule is set such that the system proceeds in a successive fashion from acceleration suppression control to engine braking control, gradual deceleration control, deceleration control, and a combination of driver brake operation and braking control (in order as listed). However, a system in accordance with the present invention can be achieved so long as it is configured to execute at least acceleration suppression control and a combination of driver brake pedal operation and braking control.

Although the first and second embodiments are configured to execute accelerator pedal actuation reaction force control and braking/driving force control based on the risk potential RP, the invention is not limited to such a configuration. For example, it is acceptable to control only the braking force and driving force exerted against the vehicle based on the risk potential RP. It is also acceptable to use the brake pedal 92 as a driver-operated driving operation device and control the actuation reaction force exerted by the brake pedal 92 based on the risk potential RP.

In the first and second embodiments, the repelling force of an imaginary elastic body 300 correlated to a time to collision TTC is calculated as the risk potential RP. However, the invention is not limited to such a risk potential calculation. For example, it is also possible to assume an imaginary elastic body correlated to a time to headway THW (=X/Vh) expressing the time required for the vehicle to reach the current position of the preceding obstacle and calculate the repelling force of the imaginary elastic body as the risk potential RP. It is also feasible to calculate a repelling force based on the time to collision TTC and a repelling force based on the time to headway THW and select the larger of the two as the risk potential RP. Still other feasible ideas include adding a function of the inverse of the time to headway THW to a function of the inverse of the time to collision TTC and using the result as the risk potential RP or selecting the larger of the two functions as the risk potential RP.

The relationship between the risk potential RP and the reaction force control command value FA is not limited to that shown in FIG. 11. It is possible to contrive the relationship such that the reaction force control command value FA increases as the risk potential RP increases.

In the second embodiment, the accelerator pedal reaction force control command value FA is corrected (adjusted) based on a signal from the operating schedule changing section 56. However, the invention is not limited to such an arrangement. For example, it is also possible to correct the accelerator pedal reaction force command value FA based on a detection result obtained from the acceleration/deceleration intent detecting section 55.

In the first and second embodiments, the laser radar 10 functions as the preceding obstacle detecting section. The braking/driving force correction amount calculating section 54, the driving force control device 73 and the braking force control device 93 function as the braking/driving force control amount calculating section and braking/driving force control section. Additionally, the accelerator pedal reaction force calculating section 53 functions as the actuation reaction force calculating section. The accelerator pedal reaction force adjusting section 58 functions as the actuation reaction force correcting section, and the accelerator pedal reaction force control device 70 can function as the actuation reaction force generating section. Moreover, the accelerator pedal stroke sensor 74 functions as the accelerator pedal actuation amount detecting section and the brake pedal stroke sensor 94 functions as the brake pedal actuation amount detecting section. However, the invention is not limited to using these particular devices. For example, instead of the laser radar 10, a milliwave radar of a different format can be used as the preceding obstacle detecting section. It is also possible to detect the acceleration/deceleration intent based solely on the actuation state of the accelerator pedal 72 as the acceleration/deceleration intent detecting section.

Third Embodiment

Figure 31:
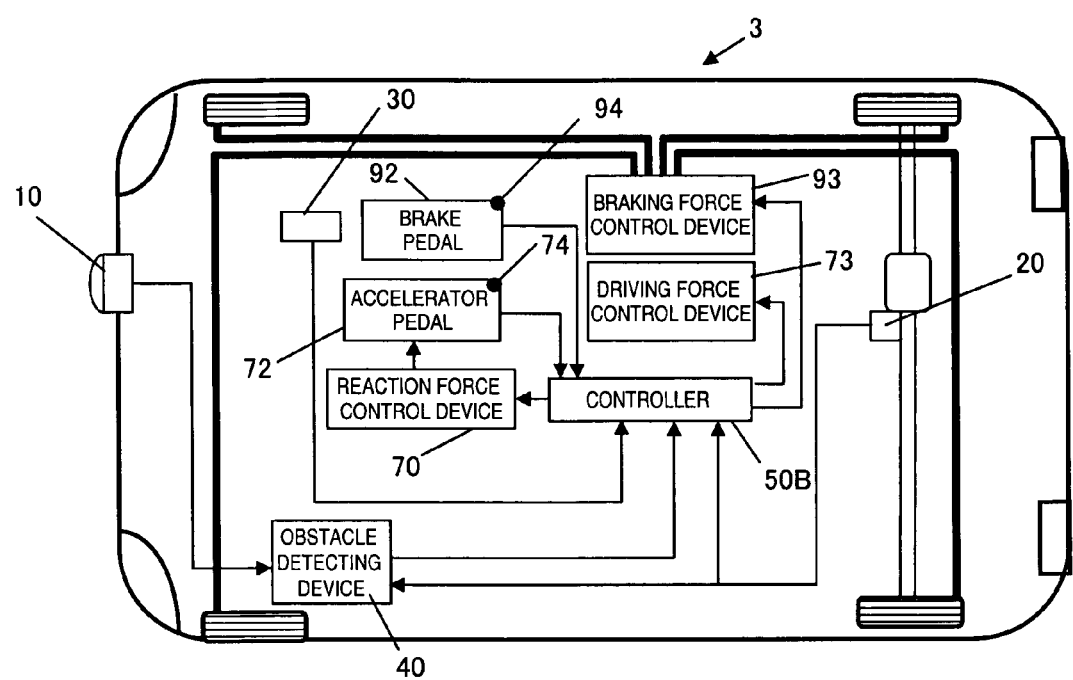
FIG. 31 is a system diagram of a vehicle driving assist system in accordance with a third embodiment of the present invention.

A vehicle driving assist system in accordance with a third embodiment of the present invention will now be explained. FIG. 31 is a system diagram showing the constituent features of a vehicle driving assist system 3 in accordance with the third embodiment. The basic constituent features the vehicle driving assist system 3 in accordance with the third embodiment are the same as those of the first embodiment shown in FIGS. 1 and 2. In FIG. 31, parts having the same functions as the parts of the first embodiment shown in FIGS. 1 and 2 are indicated with the same reference numerals. The third embodiment will be explained chiefly by describing its differences with respect to the first embodiment.

The vehicle driving assist system 3 is equipped with the laser radar 10, the vehicle speed sensor 20, the accelerator pedal reaction force control device 70, the driving force control device 73, and the braking force control device 93 from the first embodiment, while the controller 50 has been replaced with the controller 50B. Also a steering angle sensor 30 and obstacle detecting device 40 have been added in the vehicle driving assist system 3.

The preceding obstacle detecting device 40 acquires information regarding an obstacle(s) in front of the vehicle based on the detection results obtained with the laser radar 10 and the vehicle speed sensor 20. More specifically, the preceding obstacle detecting device 40 identifies a movement state of each detected object based on the detection results outputted from the laser radar 10 at each scanning cycle time or each scanning angle and determines if the detected objects are the same object or different objects based on such factors as convergence between objects (drawing toward each other) and similarity of movement between objects.

Then, based on signals from the laser radar 10 and the vehicle speed sensor 20, the preceding obstacle detecting device 40 acquires obstacle information regarding the surroundings of the vehicle, i.e., the preceding obstacle detecting device 40 recognizes the following (longitudinal) distance and relative velocity between the vehicle and each preceding obstacle as well as the lateral distance of each obstacle with respect to the vehicle and width of each obstacle. When two or more preceding obstacles are detected, the preceding obstacle detecting device 40 acquires information regarding each individual obstacle. The preceding obstacle detecting device 40 sends the acquired obstacle information to the controller 50B.

The steering angle sensor 30 is an angle sensor installed in the vicinity of the steering column or the steering wheel and is configured to detect the steering angle in terms of the rotation of the steering shaft and send the detected steering angle to the controller 50B.

The controller 50B comprises a CPU and a ROM, a RAM, and other components peripheral to the CPU and serves to control the entire vehicle driving assist system 3. The controller 50B is configured to recognize the traveling circumstances of the vehicle based on the vehicle speed obtained from the vehicle speed sensor 20 and the preceding obstacle information obtained from the preceding obstacle detecting device 40. Based on the traveling circumstances, the controller 50B calculates a risk potential that is a physical quantity indicating the degree of convergence between the vehicle and the preceding obstacle (or "risk potentials" when there are two or more obstacles).

Based on the risk potential(s) with respect to the preceding obstacle(s), the controller 50B controls the braking/driving force exerted against the vehicle and controls the actuation reaction force exerted by a driving operation device operated by the driver in order to drive the vehicle. The driver-operated driving operation device is, for example, the accelerator pedal 72 that the driver operates in order to accelerate and decelerate the vehicle. When the accelerator pedal reaction force control based on the risk potential is not being executed, the accelerator pedal 72 exerts a reaction force generated by, for example, a tensile spring (not shown in figures) in accordance with the accelerator pedal actuation amount SA.

The operation of a vehicle driving assist system 3 in accordance with the third embodiment of the present invention will now be explained. First, an overview of the operation will be provided.

The controller 50B is configured to detect the intent of the driver regarding acceleration and deceleration (acceleration/deceleration intent) and, based on the detected acceleration/deceleration intent, to adjust the correction amounts of the braking force and driving force exerted against the vehicle and the control amount for the reaction force exerted by the accelerator pedal 72. More specifically, the controller 50B adjusts the braking force correction amount, the driving force correction amount, and the reaction force control amount in accordance with the acceleration/deceleration intent such that the quantities change in a coordinated manner.

Figure 32:
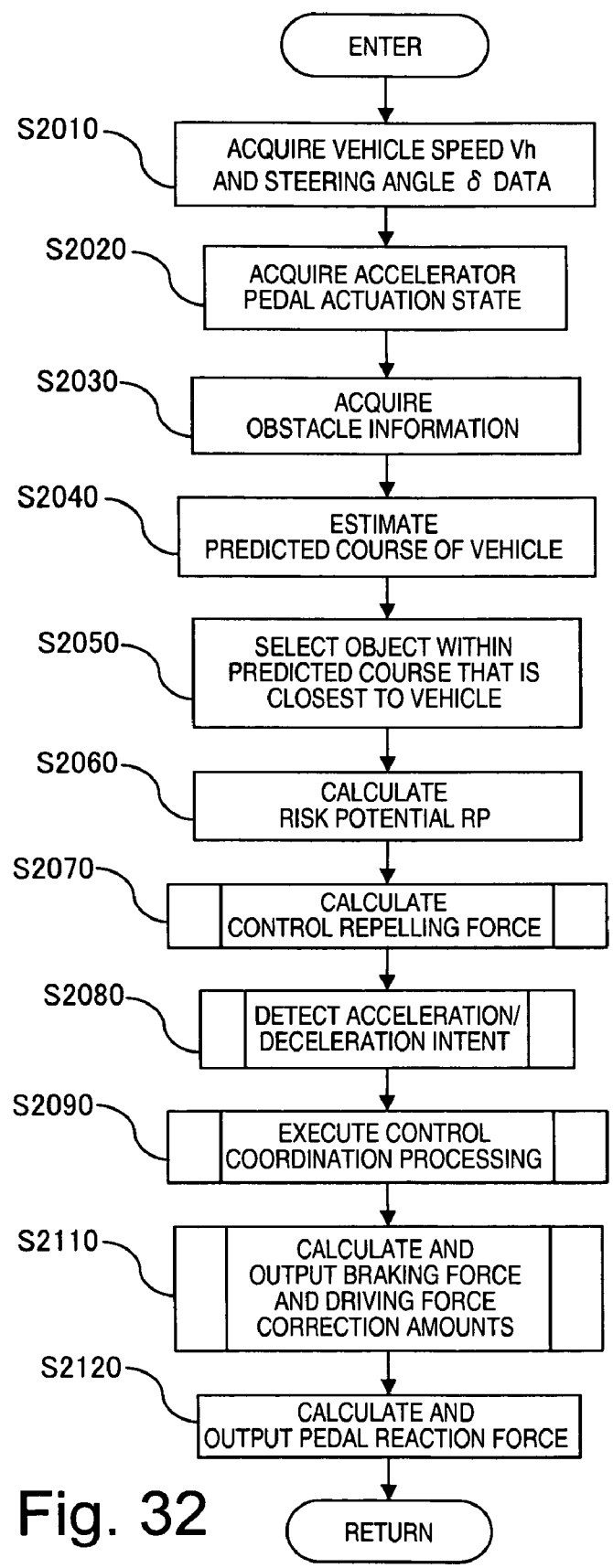
FIG. 32 is a flowchart showing the processing steps of a driving assistance control program in accordance with the third embodiment.

The operation of a vehicle driving assist system 3 in accordance with the third embodiment will now be explained in detail with reference to FIG. 32. FIG. 32 is a flowchart showing the processing steps of the driving assistance control executed by the controller 50B in the third embodiment. This control loop is executed continuously once per prescribed time period, e.g., every 50 msec.

In step S2010, the controller 50B reads in the vehicle speed Vh detected by the vehicle speed sensor 20 and the steering angle δ of the vehicle detected by the steering angle sensor 30. In step S2020, the controller 50B also reads in the accelerator pedal actuation amount SA detected by the accelerator pedal stroke sensor 74. In step S2030, the controller 50B reads in the information regarding the plurality of preceding obstacles calculated by the preceding obstacle detecting device 40 based on the detection results from the radar device 10 and the vehicle speed sensor 20. The information related to the preceding obstacles comprises, for example, the longitudinal distance (following distance) D from the vehicle to each obstacle, the lateral position x of each obstacle with respect to the vehicle, and the longitudinal position y of each obstacle with respect to the vehicle.

Figure 33:
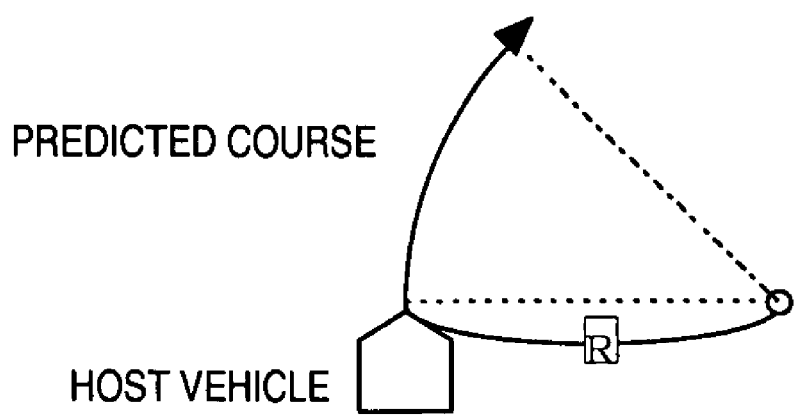
FIG. 33 is a diagram for explaining the method of calculating a predicted course of the host vehicle.

In step S2040, the controller 50B estimates the course of the vehicle based on the vehicle speed Vh and the steering angle δ read in step S2010. The method of estimating a predicted course of the vehicle will now be explained with reference to FIGS. 33 and 34. In order to estimate a predicted course of the vehicle, the controller 50B calculates the radius of curvature R of the path the vehicle will follow if it continues in the direction of the arrow as shown in FIG. 33. First, the rate of curvature ρ (units: 1/m) at which the vehicle is turning is calculated. The rate of curvature can be calculated as shown in the Equation 5 below based on the vehicle speed Vh and the steering angle δ.

$$\rho = 1/\{L(1+A \times Vh^2)\} \times \delta/N \qquad \text{(Equation 5)}$$

In the equation, L is the wheel base of the vehicle, A is a stability factor (positive constant) determined based on the vehicle, and N is the steering gear ratio.

The radius of curvature R is expressed according to the Equation 6 below based on the rate of curvature ρ.

$$R = 1/\rho \qquad \text{(Equation 6)}$$

Figure 34:
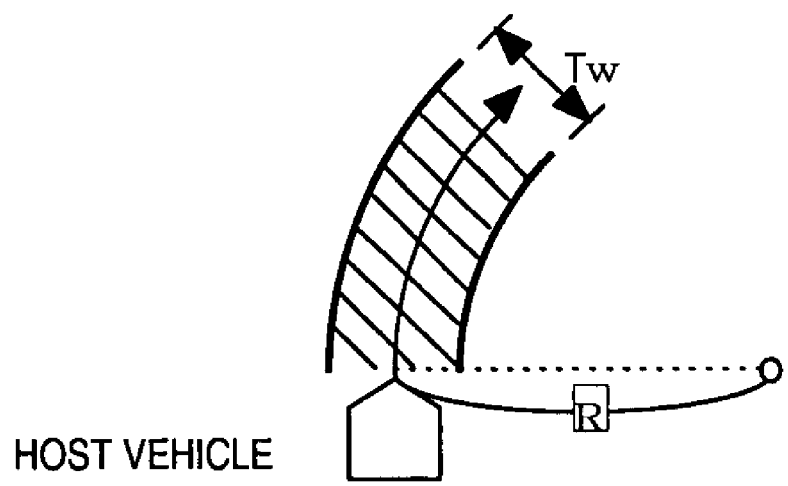
FIG. 34 is a diagram for explaining the method of calculating a predicted course of the host vehicle.

The path the vehicle will follow can then be estimated as an arc having the radius of curvature R calculated using Equation 6, as shown in FIG. 33. A region having a width Tw and a centerline corresponding to the arc having the radius of curvature R, as shown in FIG. 34, can then be set as a predicted course the vehicle can be expected to follow. The width Tw is set to an appropriate value in advance based on the width of the vehicle.

In step S2050, the controller 50B determines which of the objects detected by the preceding obstacle detecting device 40 are located within the predicted course of the vehicle and, from among those objects located within the predicted course, selects the object that is closest to the vehicle as a "preceding obstacle." The selected preceding obstacle is the preceding obstacle targeted in the calculation of the risk potential RP executed in the next step.

Figure 35:
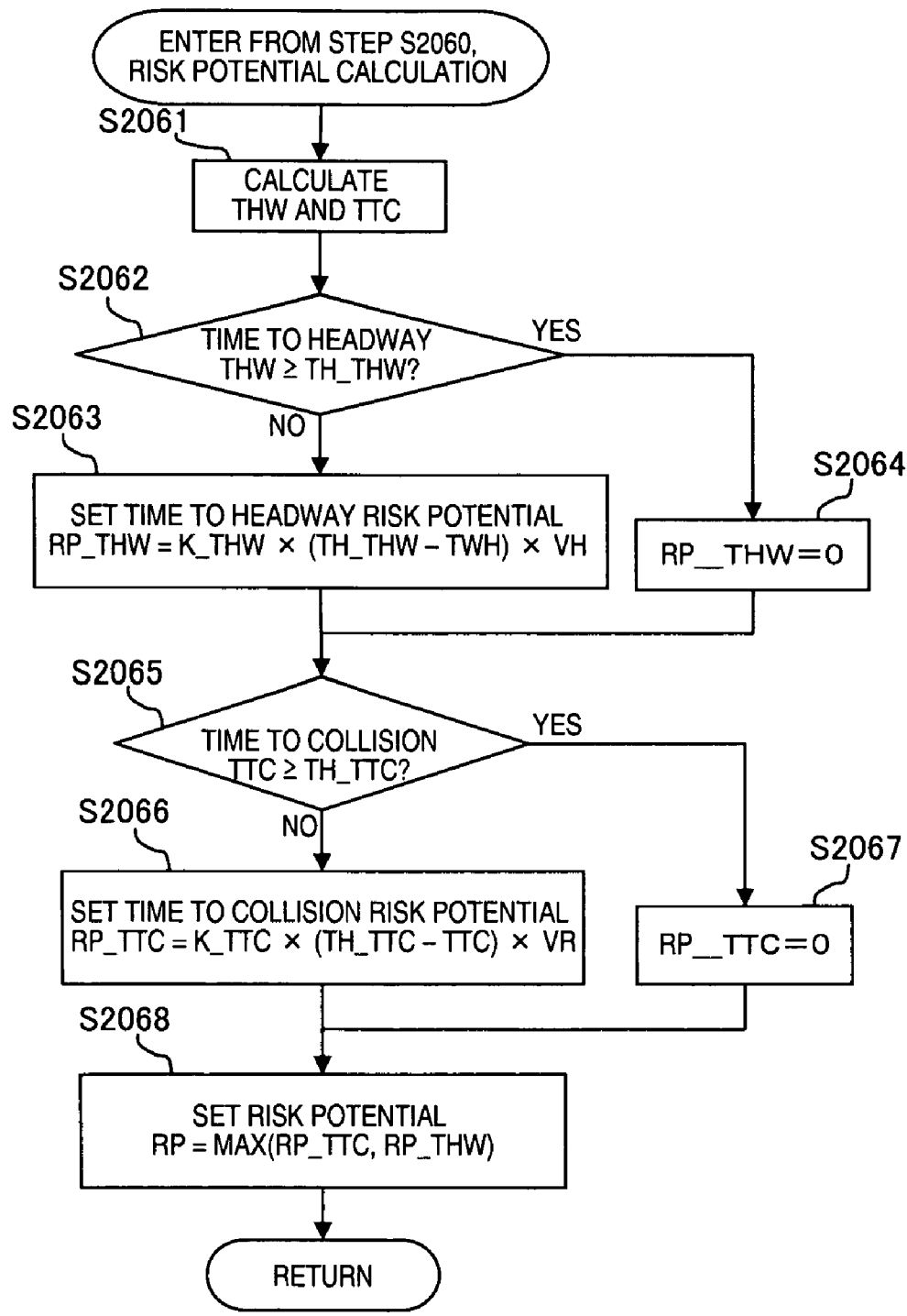
FIG. 35 is a flowchart for explaining the processing steps executed in order to calculate the risk potential.

In step S2060, the controller calculates the risk potential RP of the vehicle with respect to the preceding obstacle selected in step S2050. The control processing executed in order to accomplish step S2060 will now be explained with reference to the flowchart of FIG. 35. In the following explanation, it is assumed that the preceding obstacle is another vehicle traveling in front of the vehicle in which the system 3 is employed. In step S2061, the controller 50B calculates the time to headway THW and the time to collision TTC between the vehicle and the preceding obstacle. The time to headway THW is a physical quantity expressing the amount of time required for the vehicle to reach the current position of the preceding vehicle and is calculated using the Equation 7 shown below.

$$THW=D/Vh \qquad \text{(Equation 7)}$$

The time to collision TTC is a physical quantity indicating the current degree of convergence of the vehicle with respect to the preceding vehicle. More specifically, the time to collision TTC is a value indicating the number of seconds until the following distance D becomes zero and the vehicle contacts the preceding vehicle if the current traveling state continues, i.e., if the vehicle speed Vh and the relative velocity Vr remain constant. The relative velocity Vr is calculated as the difference between the speed of the vehicle and the speed of the preceding vehicle (Vr=vehicle speed−speed of preceding vehicle) and is set to 0 (Vr=0) when the vehicle speed is smaller than the speed of the preceding vehicle. The time to collision TTC with respect to the preceding obstacle is found using the Equation 8 shown below.

$$TTC=D/Vr \qquad \text{(Equation 8)}$$

The smaller the time to collision TTC is, the more eminent the contact with the preceding vehicle is and the larger the degree of convergence with respect to the preceding vehicle is. For example, it is known that when approaching a preceding vehicle, most drivers start taking action to decelerate before the time to collision TTC reaches 4 seconds or less. The smaller the time to headway THW and the time to collision TTC are, the more the vehicle is drawing close to the preceding vehicle.

In this embodiment, a risk potential RP_THW based on the time to headway THW is calculated using a model in which an imaginary elastic body correlated to the time to headway THW is assumed to exist between the vehicle and the preceding obstacle, and a risk potential RP_TTC based on the time to collision TTC is calculated using a model in which an imaginary elastic body correlated to the time to collision TTC is assumed to exist between the vehicle and the preceding obstacle. The risk potentials RP_THW and RP_TTC correspond to the repelling forces (compression resistance forces) exerted by the imaginary elastic bodies of the respective models.

In step S2062, the controller 50B compares the time to headway THW to a threshold value TH_THW. The threshold value TH_THW is set to an appropriate time to headway value for determining that it is time for reaction force control and braking/driving force control to be started. If the time to headway THW is smaller than the threshold value TH_THW (THW<TH_THW), the controller 50B proceeds to step S2063. In step S2063, the controller 50B calculates the risk potential RP_THW based on the time to headway THW by using the vehicle speed Vh and the time to headway THW in the Equation 9 shown below.

$$RP\_THW=K\_THW\times(TH\_THW-THW)\times Vh \qquad \text{(Equation 9)}$$

In Equation 9, the term K_THW is a spring constant of the imaginary elastic body correlated to the time to headway THW and the value of TH_TWH×Vh corresponds to the length of the imaginary elastic body.

If time to headway THW is found to be equal to or larger than the threshold value TH_THW (THW≧TH_THW) in step S2062, then the controller 50B proceeds to step S2064 and sets the value of the repelling force RP_THW to 0.

In step S2065, the controller 50B compares the time to collision TTC to the threshold value TH_TCC. The threshold value TH_TTC is set to an appropriate time to collision value for determining that it is time for reaction force control and braking/driving force control to be started. If the time to collision TTC is smaller than the threshold value TH_TTC (TTC<TH_TTC), then the controller 50B proceeds to step S2066. In step S2066, the controller 50B calculates the risk potential RP_TTC based on the time to collision TTC by using the relative velocity Vr and the time to collision TTC in the Equation 10 shown below.

$$RP\_TTC=K\_TTC\times(TH\_TTC-TTC)\times Vr \qquad \text{(Equation 10)}$$

In Equation 10, the term K_TTC is the spring constant of the imaginary elastic body correlated to the time to collision TTC and the value of TH_TTC×Vr corresponds to the length of the imaginary elastic body.

If the time to collision TTC is found to be equal to or larger than TH_TTC (TTC≧TH_TTC) in step S2065, then the controller 50B proceeds to step S2067 and sets the risk potential RP_TTC to 0.

In step S2068, the controller 50B compares the risk potential RP_THW based on the time to headway THW calculated in step S2063 or S2064 to the risk potential RP_TTC based on the time to collision TTC calculated in step S2066 or S2067 and selects the larger value to be used as the risk potential RP.

After the controller 50B calculates the risk potential RP in step S2060, the controller 50B proceeds to step S2070. In step S2070, the controller 50B calculates a control repelling force Fc to be used for calculating a target driving force, a target braking force, and an accelerator pedal reaction force control command value. The calculation of the repelling force Fc is based on the risk potential RP (of the vehicle with respect to the preceding obstacle) calculated in step S2060. The repelling force Fc is calculated according to a relationship like that shown in FIG. 13 such that the larger the risk potential RP is, the larger the calculated value of the repelling force Fc becomes.

Figure 36:
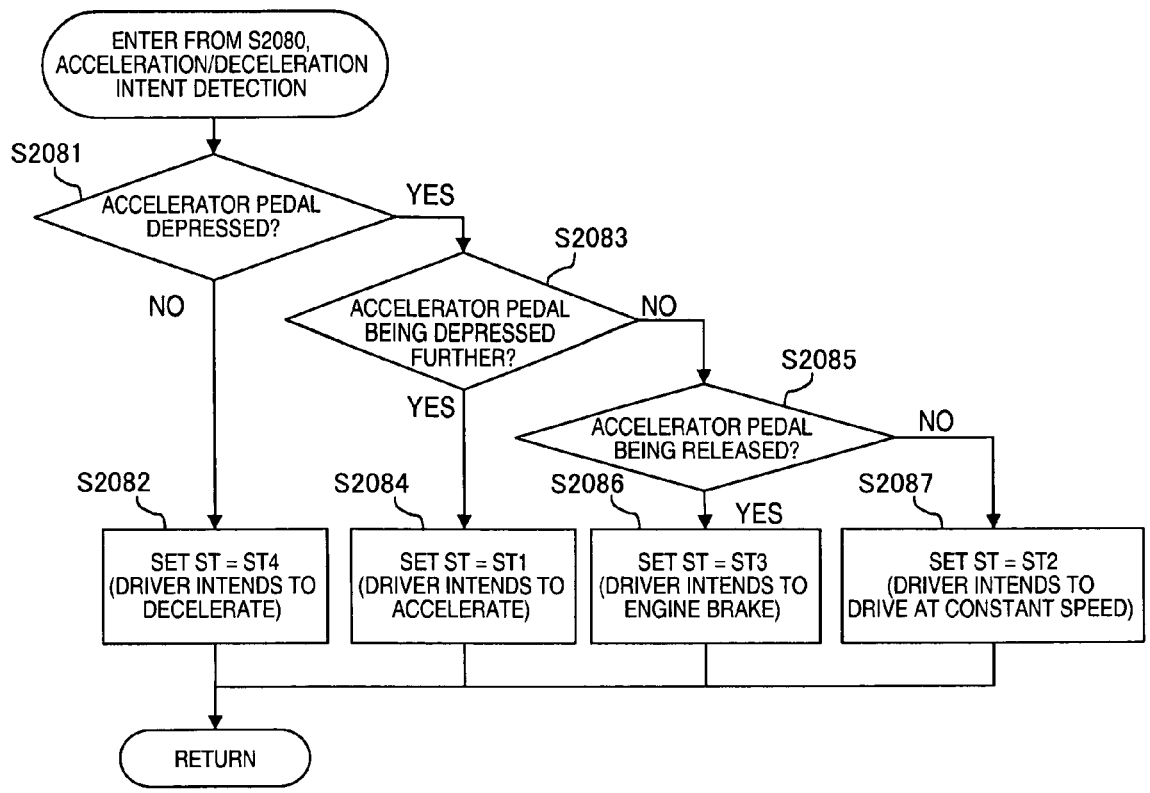
FIG. 36 is a flowchart for explaining the processing steps executed in order to detect the acceleration/deceleration intent.

In step S2080, the controller 50B detects the driver's intent regarding acceleration and deceleration based on the accelerator pedal actuation amount SA. The control processing executed in order to accomplish step S2080 will now be explained with reference to the flowchart of FIG. 36.

In step S2081, the controller 50B determines whether or not the accelerator pedal 72 is being depressed. More specifically, the controller 50B determines that the accelerator pedal 72 is being depressed if the accelerator pedal actuation amount SA read in step S2020 is larger than a prescribed value TH_0. The prescribed value TH_0 is set in advance to an appropriate value obtained by adding a value equivalent to the accelerator pedal position error to 0%. If the accelerator pedal 72 is not being depressed, then the controller 50B proceeds to step S2082. In step S2082, the controller 50B determines that the driver has released the accelerator pedal 72 and is attempting to decelerate and sets an acceleration/deceleration intent flag ST to ST4 to indicate that the driver intends to decelerate.

If the controller determines in step S2081 that the accelerator pedal 72 is being depressed, then the controller 50B proceeds to step S2083 and determines if the accelerator pedal 72 is in the process of being depressed further (i.e., if the depression amount SA is increasing). More specifically, the controller 50B determines if the actuation speed of the accelerator pedal 72 is larger than a prescribed value dTH_1. If so, then the controller 50B determines that the accelerator pedal 72 is being depressed further. The accelerator pedal actuation speed can be calculated by, for example, finding the derivative of the accelerator pedal actuation amount SA with respect to time and expressing the accelerator pedal actuation speed such that it has a positive value when the accelerator pedal 72 is being operated in the depression direction. The prescribed value dTH_1 is set to a positive value that is appropriate for determining if the accelerator pedal 72 is in the process of being depressed further while taking error into account.

If the controller determines that the accelerator pedal 72 is in the process of being depressed further, then the controller 50B proceeds to step S2084 and sets the acceleration/deceleration intent flag ST to ST1 to indicate that the driver intends to accelerate.

If the controller determines in step S2083 that the accelerator pedal 72 is not being depressed further (i.e., the depression amount SA is not increasing), then the controller 50B proceeds to step S2085 and determines if the accelerator pedal 72 is in the process of being released (i.e., is operated in the release direction). More specifically, the controller 50B determines if the actuation speed of the accelerator pedal 72 is smaller than a prescribed value −dTH_1, i.e., if the accelerator pedal is being operated in the release direction at a speed faster than the prescribed value −dTH1. If so, then the controller 50B determines that the accelerator pedal 72 is being operated in the release direction. If the controller determines that the accelerator pedal 72 is being operated in the release direction, then the controller 50B proceeds to step S2086 and sets the acceleration/deceleration intent flag ST to ST3 to indicate that the driver intends to execute engine braking. In this embodiment, the intent to execute engine braking section the driver is depressing the accelerator pedal 72 but does not intend to accelerate. Instead, the driver intends to decelerate to a slight extent that can be achieved with engine braking.

If the controller determines in step S2085 that the accelerator pedal 72 is not being operated in the release direction, then the controller 50B proceeds to step S2087. In step S2087, the controller 50B determines that the accelerator pedal is being held in generally the same position such that the vehicle speed remains substantially constant and sets the acceleration/deceleration flag ST to ST2 to indicate that the driver intends to drive at a constant speed.

Figure 37:
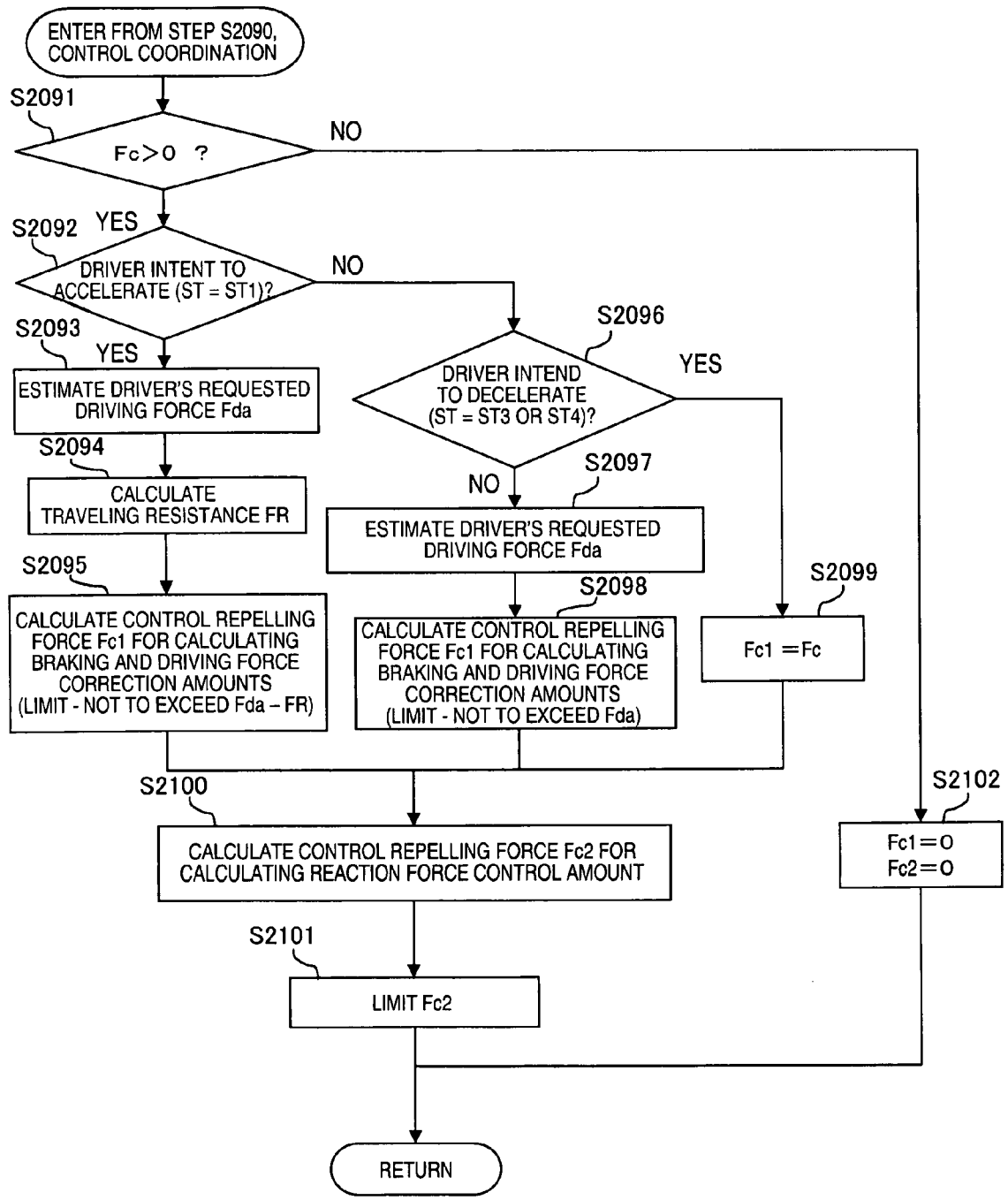
FIG. 37 is a flowchart showing the processing steps executed in order to accomplish the control coordination processing.

After the controller 50B completes the acceleration/deceleration intent detection processing of step S2080, the controller 50B proceeds to step S2090. In step S2090, the controller 50B executes processing for adjusting the braking/driving force control and actuation reaction force control. The basic braking/driving force control and actuation reaction force control is based on the risk potential RP calculated in step S2060 and step S2090 serves to adjust the basic braking/driving force control and actuation reaction force control based on the acceleration/deceleration intent detected in step S2080. More specifically, based on the intent of the driver regarding acceleration and deceleration, the controller 50B adjusts the control repelling force Fc calculated in step S2070 such that the control amounts for the braking/driving force control and the control amount for actuation reaction force control change in a coordinated manner. The control processing executed in order to accomplish step S2090 will now be explained with reference to the flowchart of FIG. 37.

In step S2091, the controller 50B determines if the control repelling force Fc calculated in step S2070 is larger than 0. If the control repelling force Fc is larger than 0 (Fc>0) and braking/driving force control and actuation reaction force control will be executed based on the risk potential RP, then the controller 50B proceeds to step S2092. In step S2092, the controller 50B determines if the acceleration/deceleration intent flag ST was set to ST1 (intent to accelerate) in step S2080. If ST=ST1, the controller 50A proceeds to step S2093.

In step S2093, the controller 50B estimates the driver's requested driving force Fda. A map like that shown in FIG. 4 is stored in the controller 50B and the driver's requested driving force Fda is estimated based on the accelerator pedal actuation amount SA by referring to the map. In step S2094, the controller 50B calculates the running resistance FR. The running resistance FR can be calculated by subtracting the ratio of the acceleration to the vehicle weight (acceleration/vehicle weight) from the driving force estimation value. The acceleration can be obtained by finding a derivative of the vehicle speed Vh with respect to time. It is also possible to provide an acceleration sensor to detect the acceleration.

In step S2095, the controller 50B uses the control repelling force Fc, the driver requested driving force Fda, and the running resistance FR to calculate a control repelling force Fc1 for calculating the braking force and driving force correction amounts. More specifically, the control repelling force Fc calculated based on the risk potential RP is limited to the difference value Fda−FR. In other words, if the control repelling force Fc is equal to or smaller than the difference (Fc≦Fda−FR), the controller 50B uses the control repelling force Fc calculated in step S2070 as the value of the control repelling force Fc1 for calculating the braking force and driving force correction amounts. If the control repelling force Fc is larger than the difference (Fc>Fda−FR), then the difference is used as the value of the control repelling force Fc1 (Fc1=Fda−FR).

If the result of step S2092 is negative, then the controller 50B proceeds to step S2096. In step S2096, the controller determines if the acceleration/deceleration intent flag ST has been set to ST3 (intent to engine brake) or ST4 (intent to decelerate). If the flag ST is set to neither ST3 nor ST4, i.e., if the flag ST is set to ST2 (intent to drive at constant speed), then the controller 50B proceeds to step S2097 and estimates the driver's requested driving force Fda based on the accelerator pedal actuation amount SA.

In step S2098, the controller 50B calculates the control repelling force Fc1 for calculating the braking force and driving force correction amounts. More specifically, the control repelling force Fc calculated based on the risk potential RP is limited to the driver's requested driving force Fda. In other words, if the control repelling force Fc is equal to or smaller than the driver's requested driving force Fda (Fc≦Fda), then the controller 50B uses the control repelling force Fc calculated in step S2070 as the value of the control repelling force Fc1 for calculating the braking force and driving force correction amounts. If the control repelling force Fc is larger than the driver's requested driving force Fda (Fc>Fda), then the driver's requested driving force Fda is used as the value of the control repelling force Fc1 (Fc1=Fda).

If the result of step S2096 is positive, i.e., if the acceleration/deceleration intent flag ST is set to ST3 (intent to engine brake) or ST4 (intent to decelerate), then the controller 50B proceeds to step S2099 and uses the control repelling force Fc calculated in step S2070 as the value of the control repelling force Fc1 for calculating the braking force and driving force correction amounts.

In step S2100, the controller 50B uses the control repelling force Fc1 to calculate a control repelling force Fc2 for calculating the reaction force control amount. The control repelling force Fc2 for calculating the reaction force control amount can be calculated using the Equation 11 shown below.

$$Fc2 = Fc \times Fc/Fc1 \quad \text{(Equation 11)}$$

Thus, the control repelling force Fc2 increases when the control repelling force Fc1 decreases and decrease when the control repelling force Fc1 increases. In short, the size of the control repelling force Fc2 for calculating the reaction force control amount is changed in a coordinated manner with respect to the control repelling force Fc1 for calculating the braking force and driving force correction amounts.

In step S2101, the controller 50B limits the control repelling force Fc2 calculated in step S2100. More specifically, the control repelling force Fc2 for calculating the reaction force control amount is limited to a value approximately twice the size of the control repelling force Fc calculated based on the risk potential RP. If the result of step S2091 is negative, i.e., if the control repelling force Fc equals 0, then the controller 50B proceeds to step S2102 and sets the control repelling force Fc1 for calculating the braking force and driving force correction amounts to 0 (Fc1=0) and the control repelling force Fc2 for calculating the reaction force control amount to 0 (Fc2=0).

Figure 38:
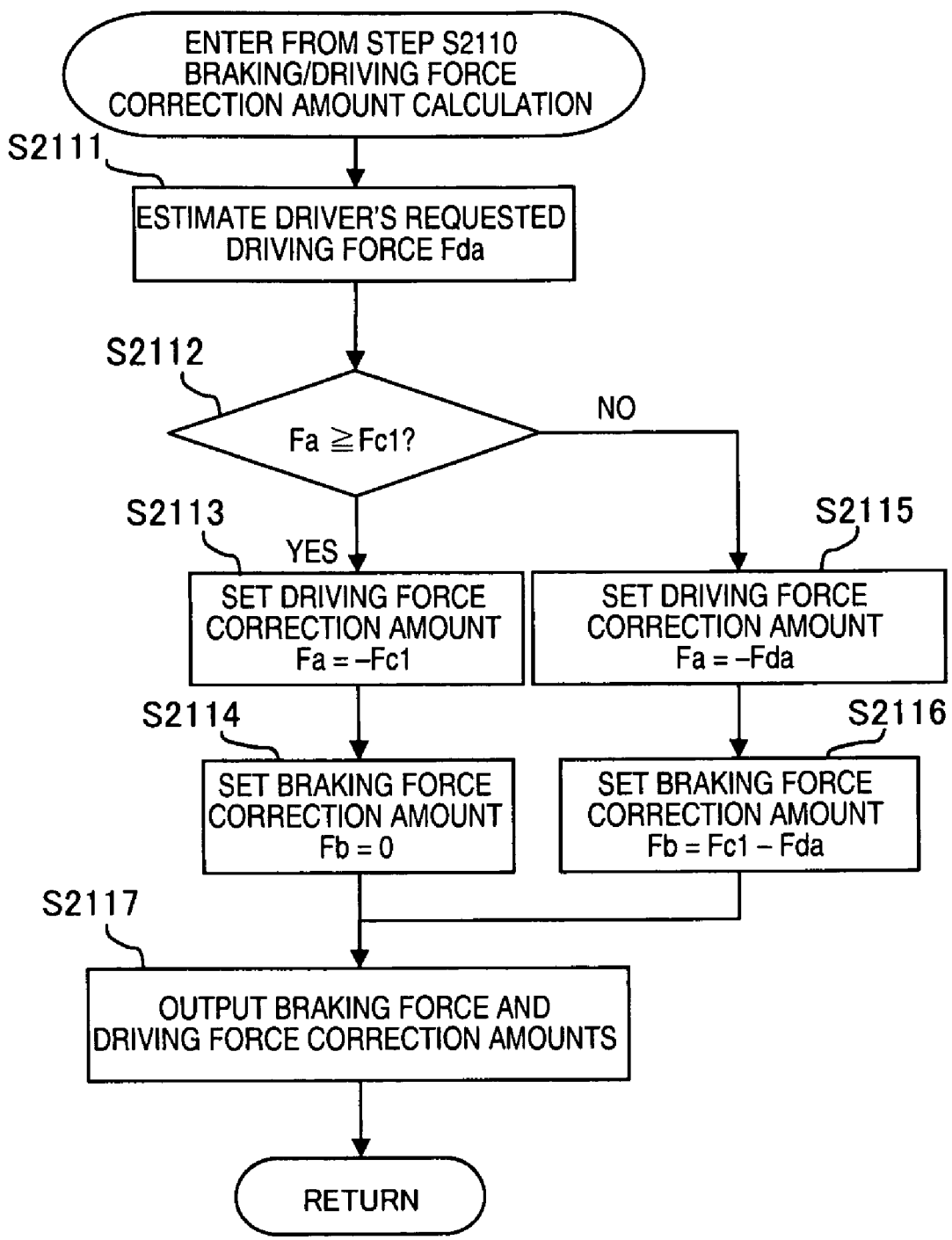
FIG. 38 is a flowchart for explaining the processing steps executed in order to calculate the driving force correction amount and the braking force correction amount.

After calculating the control repelling force Fc1 for calculating the braking force and driving force correction amounts and the control repelling force Fc2 for calculating the reaction force control amount in step S2090, the controller 50B proceeds to step S2110. In step S2110, the controller 50B uses the control repelling force Fc1 to calculate the corrected driving force correction amount Fa and the braking force correction amount Fb for executing braking/driving force control. The control processing executed in order to accomplish step S2110 will now be explained with reference to the flowchart of FIG. 38.

In step S2111, the controller 50B estimates the driver's requested drive force Fda based on the accelerator pedal actuation amount SA. In step S2112, the controller 50B compares the control repelling force Fc1 calculated in step S2090 to the driver's requested driving force Fda estimated in step S2111. If the driver's requested driving force Fda is equal to or larger than the control repelling force Fc1 (Fda≧Fc1), then the controller 50B proceeds to step S2113. In step S2113 the controller 50B sets the driving force correction amount Fa to the value −Fc1, and in step S2114 controller 50B sets the braking force correction amount Fb to 0.

In other words, since the difference Fda−Fc1 is equal to or larger than 0 (Fda−Fc1≧0), a positive driving force will remain even after the driving force Fda is corrected based on the control repelling force Fc1. Thus, the required correction amount output can be accomplished with only the driving force control device 73 outputting a correction amount. When this control is executed, the vehicle will behave in such a fashion that the full driving force expected by the driver will not be delivered even though the driver is depressing the accelerator pedal 72. If the corrected driving force is larger than the running resistance, then the driver will feel the vehicle exhibit more sluggish acceleration than expected. If the corrected driving force is smaller than the running resistance, then the driver will feel the vehicle decelerate.

Meanwhile, if the result of step S2112 is negative, i.e., if the driving force Fda is smaller than the control repelling force Fc1 (Fda<Fc1), then the targeted correction amount cannot be obtained with output from the driving force control device 73 alone. Therefore, the controller 50B proceeds to step S2115 and sets the driving force correction amount Fa to −Fda. Then, in step S2116, the controller 50B sets the braking force correction amount Fb to the amount by which the correction amount Fa is insufficient (i.e., Fc1−Fda). The driver perceives this control as deceleration behavior of the vehicle.

In step S2117, the controller 50B sends the driving force correction amount Fa calculated in step S2113 or S2115 to the driving force control device 73 and sends the braking force correction amount Fb calculated in step S2114 or S2116 to the braking force control device 93. The driving force control device 73 controls the engine torque in accordance with the command from the controller 50B. The braking force control device 93 controls the brake fluid pressure in accordance with the command from the controller 50B.

Figure 39:
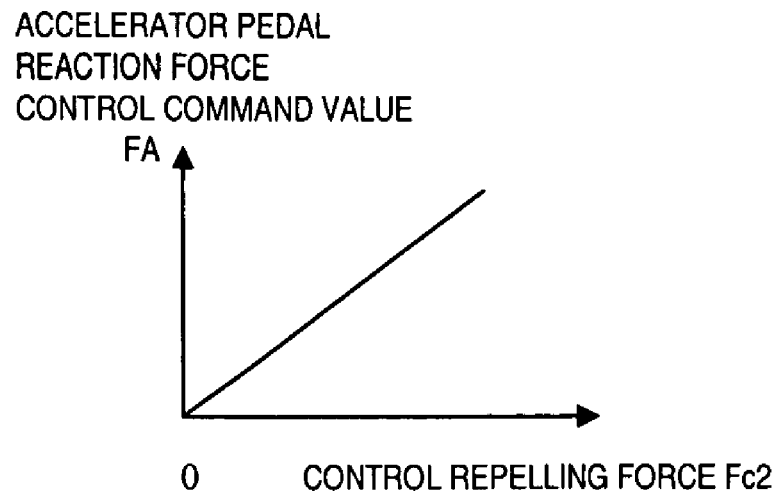
FIG. 39 is a graph plotting the accelerator pedal reaction force control command value versus the control repelling force for calculating the reaction force control amount.

After calculating the driving force correction amount Fa and the braking force correction amount Fb in step S2110, the controller 50B proceeds to step S2120. In step S2120, the controller 50B calculates a control amount for the actuation reaction force to be exerted by (generated in) the accelerator pedal 72, i.e., a accelerator pedal reaction force control command value FA, based on the control repelling force Fc2 calculated in step S2090. FIG. 39 is a plot of the accelerator pedal reaction force control command value FA versus the control repelling force Fc2 As shown in FIG. 39, the accelerator pedal reaction force control command value FA increases as the control repelling force Fc2 increases.

The controller 50B sends the accelerator pedal reaction force control command value FA calculated based on the control repelling force Fc2 to the accelerator pedal reaction force control device 70. The accelerator pedal reaction force control device 70 controls the accelerator pedal reaction force such that a reaction force corresponding to the command value from the controller 50B is added to the normal reaction force corresponding to the accelerator pedal actuation amount SA. After the command values are sent, the current control loop ends.

Figure 40:
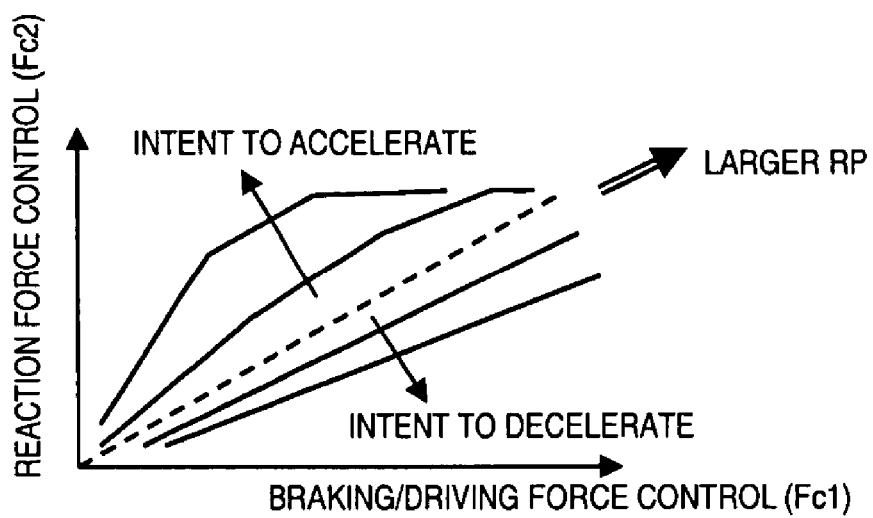
FIG. 40 is a graph plotting the operational action of the third embodiment.

The operational actions accomplished by the third embodiment will now be explained with reference to FIG. 40 and FIG. 41. FIG. 40 illustrates the relationships among the risk potential RP, the acceleration/deceleration intent, the braking/driving force control, and the actuation reaction force control in a conceptual manner. In FIG. 40, the broken line indicates the relationship that exists between the braking/driving force control and the actuation reaction force control when control coordination processing is not executed. When control coordination processing is not executed, the control amounts for the braking/driving force control and the control amount for the reaction force control all increase as the risk potential RP increases.

Meanwhile, when control coordination processing is executed, the actuation reaction force control is strengthened in comparison with the braking/driving force control (i.e., the size of the actuation reaction force is increased with respect to the braking/driving forces) when an intent to accelerate is detected. Conversely, the braking/driving force control is strengthened in comparison to the actuation reaction force control when an intent to decelerate is detected.

Figure 41:
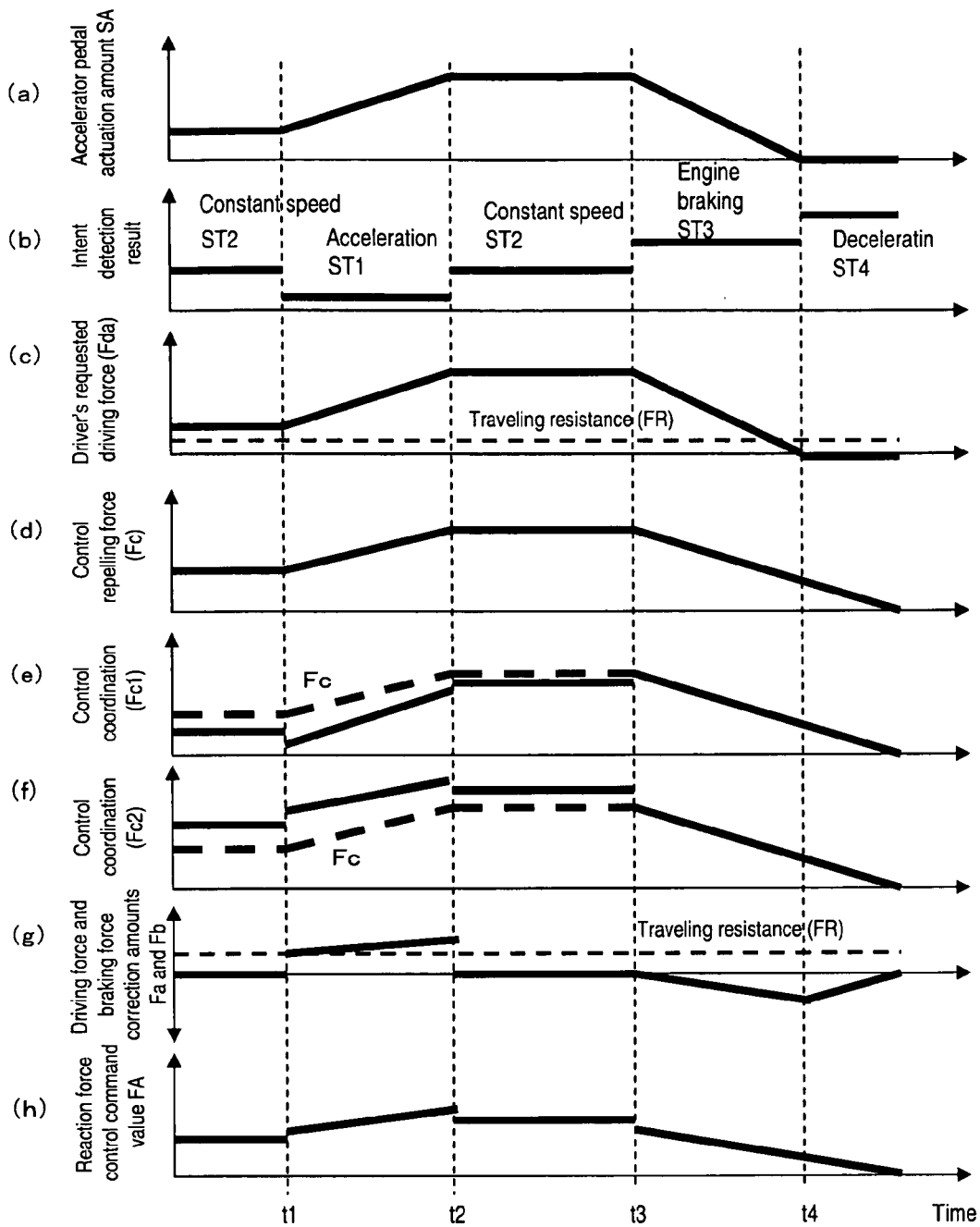
FIGS. 41 is a series of graphs plotting the operational action of the third embodiment.

Graphs (a) to (h) in FIG. 41 illustrate an example of how the accelerator pedal actuation amount SA, the intent detection result (acceleration/deceleration intent flag ST), the driver's requested driving force Fda, the control repelling force Fc, the control repelling force Fc1 for calculating the braking force and driving force correction amounts, the control repelling force Fc for calculating the reaction force control amount, the driving force and braking force control amounts Fa and Fb, and the reaction force control command value FA might change with time.

The accelerator pedal actuation amount SA is constant until a time t1, increasingly depressed until a time t2, and gradually released starting from a time t3. The driver's requested driving force Fda increases and decreases in response to the changes in the actuation amount SA. Until the time t1, the acceleration/deceleration intent of the driver is to drive at a constant speed (ST2) and the control repelling force Fc1 is calculated based on the control repelling force Fc while being limited so as not to exceed the driver requested driving force Fda. As a result, vehicle undergoes deceleration to a slight extent that can be achieved with engine braking. However, braking control (brake control) is not executed. The control repelling force Fc2 is adjusted such that it increases in contrast with the limiting of the control repelling force Fc1 and, thus, the driver can perceive the existence of the risk potential RP in a continuous manner through the accelerator pedal 72.

After the time t1, the accelerator pedal is depressed further and the acceleration/deceleration intent is detected as an intent to accelerate (ST1). The control repelling force Fc1 is calculated based on the control repelling force Fc but is also limited so as not to exceed the difference Fda−FR. As a result, the vehicle can be accelerated against the running resistance FR in accordance with the driver's intent to accelerate. At the same time, in a coordinated manner, the control repelling force Fc2 is adjusted to a larger value and the driver can perceive the existence of the risk potential RP in a continuous manner through the accelerator pedal 72.

At the time t2, the accelerator pedal actuation amount SA stops changing and the acceleration/deceleration intent is detected to be an intent to drive at a constant speed (ST2). As a result, the driving force correction amount decreases to 0. After the time t3, the accelerator pedal is operated in the release direction and the acceleration/deceleration intent is detected to be an intent to execute engine braking (ST3). During the intent to execute engine braking (ST3), the control repelling force Fc is used as is as the control reaction forces Fc1 and Fc2. As a result, the vehicle will decelerate if the control repelling force Fc1 is larger than the driver's requested driving force Fda.

At the time t4, the accelerator pedal 72 is completely released and the acceleration/deceleration intent is detected to be an intent to decelerate (ST4). During the intent to execute decelerate (ST4), the control repelling force Fc is used as is as the control reaction forces Fc1 and Fc2 and, consequently, the vehicle decelerates.

The third embodiment described heretofore can thus provide the following operational effects.

The vehicle driving assist system 3 is configured to detect an obstacle existing in front of the vehicle in which the system 1 is installed and calculate a risk potential RP of the vehicle with respect to the preceding obstacle based on the preceding obstacle detection results. The system 3 is also configured to calculate control amounts Fa and Fb for a braking force and a driving force to be exerted against the vehicle based on the risk potential RP and calculate a reaction force control amount FA for an actuation reaction force to be generated in a driver-operated driving operation device. The system 3 controls the driving force and braking force exerted against the vehicle based on the calculated braking force and driving force correction amounts (braking force and driving force control amounts) Fb and Fa and causes the driver-operated driving operation device to exert the calculated reaction force control command value (reaction force control amount) FA. The driver-operated driving operation device is, for example, the accelerator pedal 72. The controller 50B is configured to detect the acceleration/deceleration intent of the driver and, based on the detected acceleration/deceleration intent and the risk potential RP, to coordinate the control of the driving force and braking force exerted against the vehicle and the actuation reaction force generated in the driver-operated driving operation device. As a result, the braking and driving forces and the actuation reaction force can be controlled in a coordinated manner such that the change in the braking and driving forces and the change in the actuation reaction force compensate for each other. As a result, the driving assistance control can be accomplished in a manner that reduces the odd feeling imparted to the driver.

Since the acceleration/deceleration intent detected with the acceleration/deceleration intent detection processing includes both the intent to accelerate and the intent to decelerate, the driver's intent regarding driving operations can be detected.

The controller 50B is configured to correct (adjust) the driving force and braking force control amounts Fa and Fb and the reaction force control amount FA based on the detected actuation/deceleration intent. As a result, the braking/driving force control amounts Fb and Fa and reaction force control amount FA calculated based on the risk potential RP can be corrected appropriately in accordance with the intent of the driver regarding acceleration and deceleration.

The driving force control amount Fa and the braking force control amount Fb are calculated such that the driving force decreases or the braking force increases as the risk potential RP increases. The reaction force control amount FA is calculated such that the actuation reaction force generated in the driver-operated driving operation device increases as the risk potential RP increases. As a result, when the risk potential RP of the vehicle is increases, the driver can be make aware of the increasing risk potential RP in an intuitive manner by the sensation of the vehicle decelerating and by the actuation reaction force exerted by the driver-operated driving operation device increasing.

(5)The controller 50B is configured to correct the driving force and braking force correction amounts Fa and Fb such that the amount by which the driving force is reduced or the amount by which the braking force is increased becomes smaller when the intent of the driver to accelerate is stronger. As the driver's intent to accelerate becomes stronger, the acceleration/deceleration intent determined by the controller 50B shifts successively from an intent to decelerate to an intent to execute engine braking, an intent to drive at a constant speed, and an intent to accelerate (in order as listed). Since the driving force and braking force correction amounts Fa and Fb are adjusted to smaller values when the driver is attempting to accelerate, the driving assistance control can be executed in such a manner that the driver's ability to accelerate is not obstructed and the driver can accelerate in accordance with his or her intent.

The controller 50B is configured to increase the size of the reaction force control amount FA in comparison with the driving force and braking force control amounts Fa and Fb as the driver's intent to accelerate becomes stronger. Since the driving force and braking force control amounts Fa and Fb are adjusted to smaller values when the intent to accelerate is detected, the driver can be informed of the existence of the risk potential RP in a reliable fashion by increasing the reaction force control amount FA.

The controller 50B is configured to correct the driving force and braking force correction amounts Fa and Fb such that the amount by which the driving force is reduced or the amount by which the braking force is increased becomes larger when the intent of the driver to decelerate is stronger. As the driver's intent to decelerate becomes stronger, the acceleration/deceleration intent determined by the controller 50B shifts successively from an intent to accelerate to an intent to drive at a constant speed, an intent to execute engine braking, and an intent to decelerate (in order as listed). As a result, when the driver is attempting to decelerate, the driving force and braking force correction amounts Fa and Fb are adjusted to larger values such that the driver can be assisted with the deceleration operation(s) he or she is executing.

The controller 50B is configured to decrease the size of the reaction force control amount FA in comparison with the driving force and braking force control amounts Fa and Fb as the driver's intent to decelerate becomes stronger. Thus, when the intent to decelerate is detected, the driving force and braking force control amounts Fa and Fb are adjusted to larger values and, conversely, the reaction force control amount FA is adjusted to a smaller value. As a result, a balance can be established between the braking/driving force control and the actuation reaction force control and the odd feeling imparted to the driver can be reduced.

The controller 50B is configured to correct the driving force and braking force control amounts Fa and Fb such that the vehicle speed does not decrease when it is detected that the driver has an intent to accelerate. As a result, the driver's ability to accelerate is not obstructed and the driver can accelerate in accordance with his or her intent The controller 50B is configured to correct the driving force and braking force control amounts Fa and Fb such that the braking force does not increase when an intent to decelerate is not detected. More specifically, when the intent to drive at a constant speed (ST2) or the intent to accelerate (ST1) is detected, the braking force correction amount Fb is set to 0. As a result, the intent of the driver is not contradicted when the driver is performing driving operations without the intent to decelerate.

The controller 50B is configured to first correct (adjust) the driving force and braking force correction amounts Fa and Fb based on the detected acceleration/deceleration intent and, afterwards, to correct the reaction force control amount FA using the corrected driving force and braking force correction amounts Fa and Fb. More specifically, a control repelling force Fc1 for calculating the driving force and braking force correction amounts is calculated based on the risk potential RP and the acceleration/deceleration intent, and a control repelling force Fc2 for calculating the reaction force control amount is calculated using the control repelling force Fc1. As a result, the actuation reaction force control can be executed so as to be coordinated with the braking/driving force control.

Fourth Embodiment

A vehicle driving assist system in accordance with a fourth embodiment of the present invention will now be explained. The basic constituent features of a vehicle driving assist system in accordance with the fourth embodiment are the same as those of the third embodiment shown in FIG. 31. The fourth embodiment will be explained chiefly by describing its differences with respect to the third embodiment.

In the fourth embodiment, correction coefficients $\alpha$ and $\beta$ for coordinating the braking/driving force control and the actuation reaction force control are set based on the detected acceleration/deceleration intent. The correction coefficients $\alpha$ and $\beta$ are then used to calculate the control repelling force Fc1 for calculating the braking force and driving force correction amounts and the control repelling force Fc2 for calculating the reaction force control amount. The control processing executed in order to set the correction coefficients a and $\beta$ and calculate the control repelling forces Fc1 and Fc2 will now be explained with reference to the flowchart of FIG. 42. This processing is executed in step S2090 of the flowchart shown in FIG. 32.

Figures 42, 43:
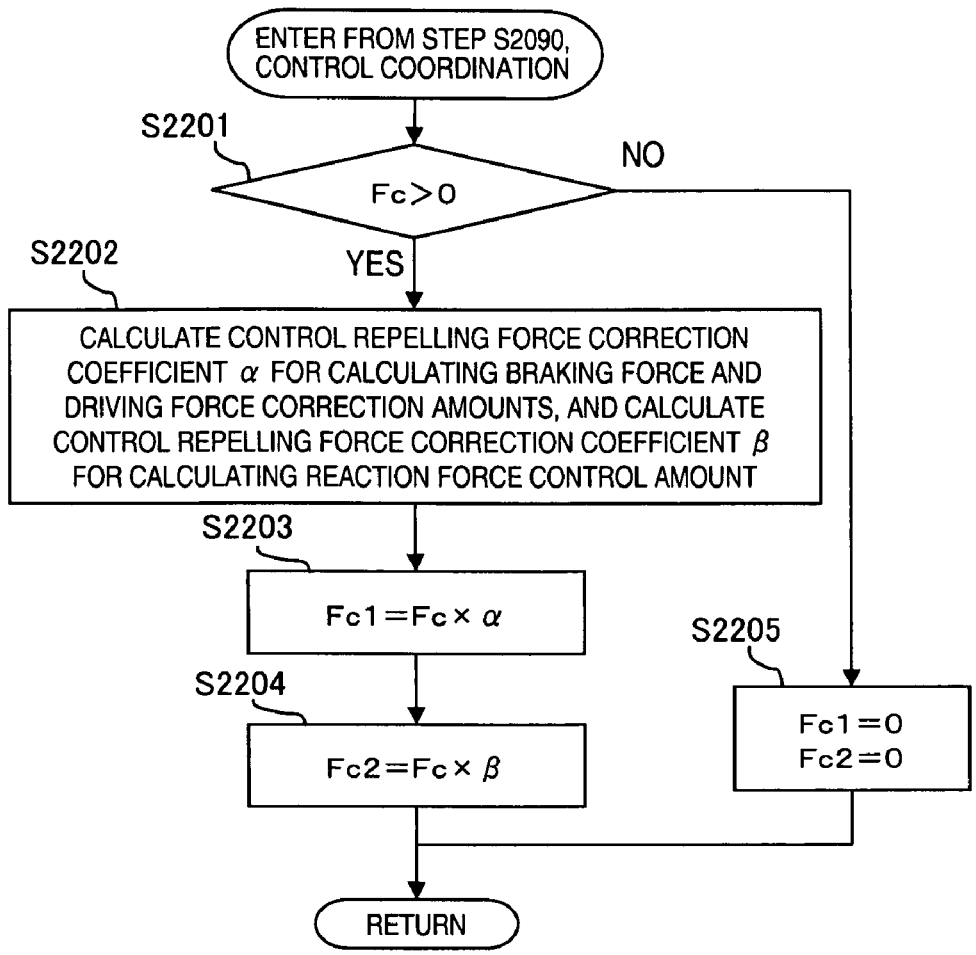
FIG. 42 is a flowchart showing the processing steps executed in a fourth embodiment in order to coordinate the driving assistance control.
FIG. 43 is a table showing the relationships among the correction coefficients and the acceleration/deceleration intent in the fourth embodiment.

In step S2201, the controller 50B determines if the control repelling force Fc calculated in step S2070 is larger than 0. If the control repelling force Fc is larger than 0 (Fc>0) and braking/driving force control and actuation reaction force control will be executed based on the risk potential RP, then the controller 50B proceeds to step S2202. In step S2202, the controller 50B sets the correction coefficients $\alpha$ and $\beta$ based on the acceleration/deceleration intent detected in step S2080. FIG. 43 shows the relationship between the acceleration/deceleration intent of the driver and the correction coefficients $\alpha$ and $\beta$.

The coefficient $\alpha$ is set to a value $\alpha 1$ ($\alpha=\alpha 1$) and the coefficient $\beta$ is set to a value $\beta 1$ ($\beta=\beta 1$) when an intent to accelerate (ST1) is detected; the coefficient a is set to a value $\alpha 2$ ($\alpha=\alpha 2$) and the coefficient $\beta$ is set to a value $\beta 2$ ($\beta=\beta 2$) when an intent to drive at a constant speed (ST2) is detected; the coefficient $\alpha$ is set to a value $\alpha 3$ ($\alpha=\alpha 3$) and the coefficient $\beta$ is set to a value $\beta 3$ ($\beta=\beta 3$) when an intent to engine brake (ST3) is detected; and the coefficient $\alpha$ is set to a value $\alpha 4$ ($\alpha=\alpha 4$) and the coefficient $\beta$ is set to a value $\beta 4$ ($\beta=\beta 4$) when an intent to decelerate (ST4) is detected. The correction coefficient values $\alpha 1$ to $\alpha 4$ for calculating the control repelling force Fc1 are set in advance to appropriate values that satisfy the relationship shown in Equation 12 below.

$$1 \geq \alpha 4 \geq \alpha 3 \geq \alpha 2 \geq \alpha 1 \geq 0 \quad \text{(Equation 12)}$$

For example, these values might be set as follows: $\alpha 1=0.2$, $\alpha 2=0.6$, $\alpha 3=1.0$, and $\alpha 4=1.0$.

The correction coefficient values $\beta 1$ to $\beta 4$ for calculating the control repelling force Fc2 are set in advance to appropriate values that satisfy the relationship shown in Equation 13 below.

$$\beta 4 \leq \beta 3 \leq \beta 2 \leq \beta 1 \quad \text{(Equation 13)}$$

For example, these values might be set as follows: $\beta 1=2$, $\beta 2=1.6$, $\beta 3=1.0$, and $\beta 4=1.0$. The values of the correction coefficient $\beta$ are restricted so as to be within 1 to 2 times the inverse ($1/\alpha$) of the values of the correction coefficient $\alpha$.

In step S2203, the control repelling force Fc calculated in step S2070 is multiplied by the correction coefficient $\alpha$ set in accordance with the acceleration/deceleration intent in step S2202 so as to calculate the control repelling force Fc1 for calculating the braking force and driving force correction amounts. The control repelling force Fc1 is found using the Equation 14 shown below.

$$Fc1 = Fc \times \alpha \quad \text{(Equation 14)}$$

In step S2204, the control repelling force Fc calculated in step S2070 is multiplied by the correction coefficient $\beta$ set in accordance with the acceleration/deceleration intent in step S2202 so as to calculate the control repelling force Fc2 for calculating the reaction force control amount. The control repelling force Fc2 is found using the Equation 15 shown below.

$$Fc2 = Fc \times \beta \quad \text{(Equation 15)}$$

If the result of step S2201 is negative, then the controller 50B proceeds to step S2205 and sets the control repelling force Fc1 for calculating the braking force and driving force control amounts to 0 (Fc1=0) and sets the control repelling force Fc2 for calculating the reaction force control amount to 0 (Fc2=0). After calculating the control repelling force Fc1 and the control repelling force Fc2 in step S2090, the controller 50B proceeds to step S2110.

By calculating the control repelling force Fc1 and the control repelling force Fc2 using correction coefficients $\alpha$ and $\beta$, which are set based on the detected acceleration/deceleration intent, the same effects can be obtained as are obtained with the third embodiment. Additionally, the calculation of the control repelling forces Fc1 and Fc2 is simplified by preparing appropriate values for the correction coefficients $\alpha$ and $\beta$ in advance.

The prepared values for the correction coefficients $\alpha$ and $\beta$ can be set differently than described above while still satisfying the requirements defined in Equations 12 and 13. Examples are shown in FIGS. 44 and 45 and are described below.

As shown in FIG. 44, the prepared coefficient values can be set to $\alpha 1=0.2$ and $\beta 1=2$ for an intent to accelerate (ST1); $\alpha 2=0.6$ and $\alpha 2=1.6$ for an intent to drive at a constant speed (ST2); $\alpha 3=0.8$ and $\beta 3=1.2$ for an intent to engine brake (ST3); and $\alpha 4=1.0$ and $\beta 4=1.0$ for an intent to decelerate (ST4). By setting the correction coefficients $\alpha$ and $\beta$ such that they change more finely between the intent to engine brake (ST3) and the intent to decelerate (ST4), a smoother operation can be obtained.

As shown in FIG. 45, the prepared coefficient values can be set to $\alpha 1=0.0$ and $\beta 1=2$ for an intent to accelerate (ST1); $\alpha 2=0.6$ and $\beta 2=1.0$ for an intent to drive at a constant speed (ST2); $\alpha 3=0.8$ and $\beta 3=1.0$ for an intent to engine brake (ST3); and $\alpha 4=1.0$ and $\beta 4=1.0$ for an intent to decelerate (ST4). In this example, the only time the correction coefficient $\beta$ is set to a value larger than 1 is when an intent to accelerate (ST1) is detected and the correction coefficient a is set to 0. As a result, the driver can be informed in a very clear manner that the system will not execute braking/driving force control because an intent to accelerate has been detected.

In the third and fourth embodiments, a control repelling force Fc1 for calculating the braking force and driving force correction amounts and a control repelling force Fc2 for calculating the reaction force control amount are calculated based on the control repelling force Fc, which is calculated based on the risk potential RP. However, the invention is not limited to this method of calculating the control repelling forces Fc1 and Fc2. For example, it is possible to use the risk potential RP to calculate a risk potential RP1 for calculating the braking force and driving force correction amounts and a risk potential RP2 for calculating the reaction force control amount and then use the risk potentials RP1 and RP2 to calculate the control repelling force Fc1 for calculating the braking force and driving force correction amounts and the control repelling force Fc2 for calculating the reaction force control amount. It is also possible to omit the calculation of the control repelling forces Fc1 and Fc2 and calculate the driving force correction amount Fa, the braking force correction amount Fb, and the reaction force control command value FA directly based on the risk potentials RP1 and RP2.

In the third and fourth embodiments, the laser radar 10 can function as the preceding obstacle detecting section; the risk potential calculation processing portion of the processing executed by the controller 50B can function as the risk potential calculating section; the braking/driving force correction amount calculation processing portion can function as the braking/driving force control amount calculating section; the reaction force calculation processing portion can function as the actuation reaction force calculating section; the acceleration/deceleration intent detection processing portion can function as the acceleration/deceleration detecting section; and the control coordination processing can function as the control coordinating section. Also, the driving force control device 73 and the braking force control device 93 can function as the braking/driving force control section and the accelerator pedal control device 70 can function as the actuation reaction force generating section. However, the invention is not limited to using these particular devices. For example, instead of the laser radar 10, a milliwave radar of a different format can be used as the preceding obstacle detecting section. It is also possible to omit the intent to drive at a constant speed and the intent to engine brake from the acceleration/deceleration intent detecting section and configure the acceleration/deceleration intent detecting section to detect only the intent to accelerate and the intent to decelerate. The acceleration/deceleration intent detecting section can also be configured to detect the acceleration/deceleration intent based on the operating states of both the accelerator pedal 72 and the brake pedal 92.

While only selected embodiments have been chosen to illustrate the present invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents.

What is claimed is:

1. A vehicle driving assist system comprising:
   an accelerator pedal actuation amount detecting section configured to detect an amount of actuation of an accelerator pedal of a host vehicle by a driver;
   a risk potential calculating section configured to calculate a risk potential of the host vehicle with respect to a preceding obstacle based on detected information regarding the preceding obstacle;
   a driving force correction amount calculating section configured to calculate a driving force correction amount based on the risk potential calculated by the risk potential calculating section so that a requested driving force determined according to the amount of actuation of the accelerator pedal is reduced by the driving force correction amount;
   an acceleration/deceleration intent detecting section configured to detect an acceleration/deceleration intent of the driver based on the amount of actuation of the accelerator pedal;
   a driving force correction amount adjusting section configured to adjust the driving force correction amount based on the acceleration/deceleration intent of the driver detected by the acceleration/deceleration intent detecting section; and
   a driving force control section configured to control a driving force exerted against the host vehicle in accordance with the requested driving force corrected by the driving force correction amount.

2. The vehicle driving assist system as recited in claim 1, further comprising
   an actuation reaction force calculating section configured to calculate an actuation reaction force to be exerted on the accelerator pedal based on the risk potential; and an actuation reaction force correcting section configured to correct the actuation reaction force calculated by the actuation reaction force calculating section based on the acceleration/deceleration intent of the driver detected by the acceleration intent detecting section; and an actuation reaction force generating section configured to produce the actuation reaction force to be exerted on the accelerator pedal as corrected by the actuation reaction force correcting section.

3. The vehicle driving assist system as recited in claim 1, further comprising an operating schedule setting section configured to set an operating schedule for controlling the driving force and a braking force of the host vehicle in a successive fashion from executing driving force control to executing braking force control in accordance with the risk potential, and an operating schedule changing section configured to change the operating schedule such that only the driving force control is executed when the acceleration/deceleration intent detected by the acceleration/deceleration intent detecting section indicates that the driver intends to accelerate, the driving force correction amount adjusting section being configured to adjust the driving force correction amount according to the operating schedule changed by the operating schedule changing section.

4. The vehicle driving assist system as recited in claim 1, further comprising an operating schedule setting section configured to set an operating schedule for controlling the driving force and a braking force of the host vehicle in a successive fashion from executing an acceleration suppression control to executing an engine torque reduction control, a gradual deceleration control, and finally a braking control in accordance with the risk potential, and an operating schedule changing section configured to change an operating schedule such that only the acceleration suppression is executed when the acceleration/deceleration intent of the driver indicates the driver intends to accelerate, and the engine torque reduction and the gradual deceleration, and braking are successively added to the acceleration suppression as the acceleration/deceleration intent indicates the driver's intent to accelerate decreases, the driving force correction amount adjusting section being configured to change the driving force correction amount according to the operating schedule changed by the operating schedule changing section.

5. The vehicle driving assist system as recited in claim 1, wherein the acceleration/deceleration intent detecting section is configured to detect the acceleration/deceleration intent of the driver as at least one of an intent to accelerate, an intent to drive at a constant speed, an intent to engine brake, and an intent to decelerate gradually.

6. The vehicle driving assist system as recited in claim 1, further comprising a brake pedal actuation amount detecting section configured to detect an amount of actuation of a brake pedal of the host vehicle by the driver, the acceleration/deceleration intent detecting section is configured to detect the acceleration/deceleration intent based on the detected accelerator pedal actuation amount and the detected brake pedal actuation amount.

7. The vehicle driving assist system as recited in claim 2, wherein the actuation reaction force correcting section is configured to increase the actuation reaction force when the acceleration/deceleration intent of the driver indicates the driver intends to accelerate.

8. A vehicle equipped with a vehicle driving assist system comprising:

an accelerator pedal actuation amount detecting section configured to detect an amount of actuation of an accelerator pedal of the vehicle by a driver;

a risk potential calculating section configured to calculate a risk potential of the vehicle with respect to a preceding obstacle based on detected information regarding the preceding obstacle;

a driving force correction amount calculating section configured to calculate a driving force correction amount based on the risk potential calculated by the risk potential calculating section so that a requested driving force determined according to the amount of actuation of the accelerator pedal is reduced by the driving force correction amount;

an acceleration/deceleration intent detecting section configured to detect an acceleration/deceleration intent of the driver based on the amount of actuation of the accelerator pedal;

a driving force correction amount adjusting section configured to adjust the driving force correction amount based on the acceleration/deceleration intent of the driver detected by the acceleration/deceleration intent detecting section; and a driving force control section configured to control a driving force exerted against the host vehicle in accordance with the requested driving force corrected by the driving force correction amount.

9. A vehicle driving assist system comprising:

a risk potential calculating section configured to calculate a risk potential of a host vehicle with respect to a preceding obstacle based on detected information regarding the preceding obstacle;

an acceleration/deceleration intent detecting section configured to detect an acceleration/deceleration intent of a driver based on an amount of actuation of a driver-operated driving operation device of the host vehicle;

a driving force control section configured to calculate a driving force exerted against the host vehicle based on the amount of actuation of the driver-operated driving operation device and the risk potential;

an actuation reaction force calculating section configured to calculate an actuation reaction force to be exerted on the driver-operated driving operation device based on the risk potential; and an adjusting section configured to adjust the actuation reaction force calculated by the actuation reaction force calculating section and the driving force calculated by the driving force control section based on the acceleration/deceleration intent of the driver.

10. The vehicle driving assist system as recited in claim 9, further comprising a preceding obstacle detecting section configured to detect when the preceding obstacle exists in front of the host vehicle, with the risk potential calculating section being further configured to calculate the risk potential of the host vehicle with respect to the preceding obstacle based on a detection result obtained from the preceding obstacle detecting section, the driving force control section including a driving force control amount calculating section configured to calculate a driving force control amount based on the risk potential calculated by the risk potential calculating section for controlling the driving force exerted against the host vehicle;

the adjusting section being configured to coordinate the control of the driving force exerted against the host vehicle and the actuation reaction force exerted by the driver-operated driving operation device based on the acceleration/deceleration intent of the driver detected by the acceleration/deceleration intent detecting section.

11. The vehicle driving assist system as recited in claim 10, wherein
the acceleration/deceleration intent detecting section is configured to detect the acceleration/deceleration intent of the driver as at least one of an intent to accelerate and an intent to decelerate.

12. The vehicle driving assist system as recited in claim 10, wherein
the adjusting section is configured to correct the driving force control amount calculated by the driving force control amount calculating section and the reaction force control amount calculated by the actuation reaction force calculating section in accordance with the detected acceleration/deceleration intent.

13. The vehicle driving assist system as recited in claim 12, wherein
the driving force control amount calculating section is further configured to calculate the driving force control amount such that the driving force decreases by a correction amount as the risk potential increases; and
the actuation reaction force calculating section is further configured to calculate the reaction force control amount such that the actuation reaction force exerted by the driver-operated driving operation device increases as the risk potential increases.

14. The vehicle driving assist system as recited in claim 13, wherein
the adjusting section is configured to correct the driving force control amount based on the detected acceleration/deceleration intent to decrease the correction amount as the driver's intent to accelerate increases.

15. The vehicle driving assist system as recited in claim 13, wherein
the adjusting section is configured to correct a magnitude of the reaction force control amount with respect to the driving force control amount based on the detected acceleration/deceleration intent such that the magnitude of the reaction force control amount with respect to the driving force control amount increases as the driver's intent to accelerate increases.

16. The vehicle driving assist system as recited in claim 13, wherein
the adjusting section is configured to correct the driving force control amount based on the detected acceleration/deceleration intent to increase the correction amount as the driver's intent to decelerate increases.

17. The vehicle driving assist system as recited in claim 13, wherein
the adjusting section is configured to correct a magnitude of the reaction force control amount with respect to the driving force control amount based on the detected acceleration/deceleration intent such that the magnitude of the reaction force control amount with respect to the driving force control amount decreases as the driver's intent to decelerate increases.

18. The vehicle driving assist system as recited in claim 13, wherein
the adjusting section is configured to correct the driving force control amount such that the host vehicle speed does not decrease upon detecting that the driver has an intent to accelerate.

19. The vehicle driving assist system as recited in claim 13, wherein
the adjusting section is further configured to correct the driving force control amount such that a braking force does not increase when an intent of the driver to decelerate is not detected.

20. The vehicle driving assist system as recited in claim 12, wherein
the adjusting section is configured to correct the reaction force control amount using the corrected driving force control amount after the driving force control amount has been corrected based on the detected acceleration/deceleration intent.

21. A vehicle equipped with a vehicle driving assist system comprising:
a risk potential calculating section configured to calculate a risk potential of the vehicle with respect to a preceding obstacle based on detected information regarding the preceding obstacle;
an acceleration/deceleration intent detecting section configured to detect an acceleration/deceleration intent of a driver based on an amount of actuation of a driver-operated driving operation device of the host vehicle;
a driving force control section configured to calculate a driving force exerted against the host vehicle based on the amount of actuation of the driver-operated driving operation device and the risk potential;
an actuation reaction force calculating section configured to calculate an actuation reaction force to be exerted on the driver-operated driving operation device based on the risk potential; and
an adjusting section configured to adjust the actuation reaction force calculated by the actuation reaction force calculating section and the driving force calculated by the driving force control section based on the acceleration/deceleration intent of the driver.

22. A vehicle driving assist system comprising:
accelerator pedal actuation amount detecting means for detecting an amount of actuation of an accelerator pedal of a host vehicle by a driver;
risk potential calculating means for calculating a risk potential of the host vehicle with respect to a preceding obstacle based on detected information regarding the preceding obstacle;
driving force correction amount calculating means for calculating a driving force correction amount based on the risk potential so that a requested driving force determined according to the amount of actuation of the accelerator pedal is reduced by the driving force correction amount;
acceleration/deceleration intent detecting means for detecting an acceleration/deceleration intent of the driver based on the amount of actuation of the accelerator pedal;
driving force correction amount adjusting means for adjusting the driving force correction amount based on the acceleration/deceleration intent of the driver detected by the acceleration/deceleration intent detecting means; and
driving force control means for controlling a driving force exerted against the host vehicle in accordance with the requested driving force corrected by the driving force correction amount.

23. A vehicle driving assist system comprising:
risk potential calculating means for calculating a risk potential of a host vehicle with respect to a preceding obstacle based on detected information regarding the preceding obstacle;
acceleration/deceleration intent detecting means for detecting an acceleration/deceleration intent of a driver based on an amount of actuation of a driver-operated driving operation device of the host vehicle;
driving force control means for calculating a driving force exerted against the host vehicle based on the amount of actuation of the driver-operated driving operation device and the risk potential;
actuation reaction force calculating means for calculating an actuation reaction force to be exerted on the driver-operated driving operation device based on the risk potential; and
adjusting means for adjusting the actuation reaction force calculated by the actuation reaction force calculating means and the driving force calculated by the driving force control means based on the acceleration/deceleration intent of the driver.

24. A vehicle driving assistance method comprising:
detecting an amount of actuation of an accelerator pedal of a host vehicle by a driver;
calculating a risk potential of the host vehicle with respect to a preceding obstacle based on detected information regarding the preceding obstacle;
calculating a driving force correction amount based on the risk potential so that a requested driving force determined according to the amount of actuation of the accelerator pedal is reduced by the driving force correction amount;
detecting an acceleration/deceleration intent of the driver based on the amount of actuation of the accelerator pedal;
adjusting the driving force correction amount based on the detected acceleration/deceleration intent; and
controlling a driving force exerted against the host vehicle in accordance with the requested driving force corrected by the driving force correction amount.

25. A vehicle driving assistance method comprising:
calculating a risk potential of a host vehicle with respect to a preceding obstacle based on detected information regarding the preceding obstacle;
detecting an acceleration/deceleration intent of a driver based on an amount of actuation of a driver-operated driving operation device of the host vehicle;
calculating a driving force exerted against the host vehicle based on the amount of actuation of the driver-operated driving operation device and the risk potential;
calculating an actuation reaction force to be exerted on the driver-operated driving operation device based on the risk potential; and
adjusting the calculated actuation reaction force and the calculated driving force based on the acceleration/deceleration intent of the driver.

* * * * *